(12) United States Patent
Kang et al.

(10) Patent No.: US 7,813,734 B2
(45) Date of Patent: *Oct. 12, 2010

(54) SYSTEM AND METHOD TO PERFORM A HANDOVER IN A BROADBAND WIRELESS ACCESS COMMUNICATION SYSTEM

(75) Inventors: Hyun-Jeong Kang, Seoul (KR);
Chang-Hoi Koo, Seongnam-si (KR);
Jung-Je Son, Seongnam-si (KR);
Hyoung-Kyu Lim, Seoul (KR);
Yeong-Moon Son, Anyang-si (KR);
So-Hyun Kim, Suwon-si (KR);
Sung-Jin Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 831 days.

This patent is subject to a terminal disclaimer.

(21) Appl. No.: 11/728,582

(22) Filed: Mar. 26, 2007

(65) Prior Publication Data
US 2007/0249355 A1 Oct. 25, 2007

Related U.S. Application Data

(62) Division of application No. 11/071,743, filed on Mar. 3, 2005, now Pat. No. 7,623,864.

(30) Foreign Application Priority Data

Mar. 5, 2004 (KR) ............... 15217-2004
May 7, 2004 (KR) ............... 32215-2004

(51) Int. Cl.
*H04W 36/00* (2009.01)
*H04W 4/00* (2009.01)

(52) U.S. Cl. ............... 455/438; 455/437; 455/442; 370/331

(58) Field of Classification Search ............... 455/439, 455/440, 441, 436, 438, 437, 442; 370/331
See application file for complete search history.

(56) References Cited

U.S. PATENT DOCUMENTS 5,267,261 A 11/1993 Blakeney, II et al.
6,055,427 A * 4/2000 Ojaniemi ............... 455/436
6,266,530 B1 * 7/2001 Stalo ............... 455/436
6,430,412 B1 * 8/2002 Hogg et al. ............... 455/436
6,507,567 B1 * 1/2003 Willars ............... 370/321

(Continued)

FOREIGN PATENT DOCUMENTS

DE 19922177 A1 12/2001

(Continued)

OTHER PUBLICATIONS

Part 16: Air Interface for Fixed and Mobile Broadband Wireless Access Systems—Amendment for Physical and Medium Access Control Layers for Combined Fixed and Mobile Operation in Licensed Bands, Dec. 9, 2003.
Sungjin Lee et al., IEEE 802.16e HO Options for Forcing and Suggesting HO, Sep. 4, 2003.

(Continued)

*Primary Examiner*—George Eng
*Assistant Examiner*—Christopher M Brandt
(74) *Attorney, Agent, or Firm*—The Farrell Law Firm, LLP

(57) ABSTRACT

Disclosed is a method for recognizing by a Mobile Subscriber Station (MSS) whether a serving Base Station (BS) retains connection information in a mobile communication system including the serving BS for providing a service to the MSS and a target BS adjacent to the serving BS. The method includes the steps of receiving a handover request message from the serving BS, the handover request message including a resource remain type field representing whether the connection information having been set with the serving BS is retained, and a resource retain time field representing a connection information-retaining time by the serving BS, and recognizing that the serving BS retains the connection information during a time determined by a value of the resource retain time field.

11 Claims, 11 Drawing Sheets

U.S. PATENT DOCUMENTS

| | | | |
|---|---|---|---|
| 6,778,830 B1 | 8/2004 | Oizumi et al. | |
| 7,200,401 B1 * | 4/2007 | Hulkkonen et al. | 455/438 |
| 7,466,679 B2 * | 12/2008 | Alberth et al. | 370/331 |
| 2003/0032431 A1 * | 2/2003 | Chang | 455/438 |
| 2003/0054824 A1 * | 3/2003 | Choi et al. | 455/436 |
| 2003/0202489 A1 | 10/2003 | Lee | |
| 2003/0224792 A1 * | 12/2003 | Verma et al. | 455/436 |
| 2004/0266474 A1 * | 12/2004 | Petrus | 455/525 |
| 2005/0073969 A1 * | 4/2005 | Hart et al. | 370/318 |
| 2005/0124345 A1 * | 6/2005 | Laroia et al. | 455/437 |

FOREIGN PATENT DOCUMENTS

| | | |
|---|---|---|
| EP | 1018849 | 7/2000 |
| JP | 2001-359136 A | 11/2000 |
| RU | 2146081 | 2/2000 |
| WO | WO 99/43178 | 8/1999 |

OTHER PUBLICATIONS

Kang et al.; "Resource Remain Type of Drop or Ping Pong Call Recovery"; IEEE 802.16 Broadband Wireless Access Working Group; Mar. 5, 2004.

IEEE 802.16e Tge Working Document; "Amendment for Physical and Medium Access Control Layers for Combined Fixed and Mobile Operation in Licensed Bands"; Dec. 9, 2003.

* cited by examiner

SYSTEM AND METHOD TO PERFORM A HANDOVER IN A BROADBAND WIRELESS ACCESS COMMUNICATION SYSTEM

PRIORITY

This application is a Divisional Application of U.S. patent application Ser. No. 11/071,743 filed as Mar. 3, 2005, now U.S. Pat. No. 7,623,864 which claims priority to two applications entitled "System and Method for Handover to minimize Service Delay due to Ping Pong Effect in BWA Communication System" filed in the Korean Intellectual Property Office on Mar. 5, 2004 and assigned Serial No. 2004-15217, and filed on May 7, 2004 and assigned Serial No. 2004-32215, the contents of each of which are hereby incorporated by reference.

BACKGROUND OF THE INVENTION

1. Field of the Invention

The present invention relates to a Broadband Wireless Access (BWA) communication system, and more particularly to a system and a method for performing a handover, that can minimize a service delay due to a pingpong effect.

2. Description of the Related Art

In a $4^{th}$ generation (4G) communication system, which is the next generation communication system, research has been actively pursued to provide users with services having various qualities of service (QoS) at a transmission speed of about 10 Mbps. In particular, in the current 4G communication system, research has been actively pursued to support a high speed service capable of ensuring mobility and QoS in a BWA communication system such as a wireless local area network (LAN) system and a wireless metropolitan area network (MAN) system. A representative communication system of the 4G communication system is based on an IEEE (Institute of Electrical and Electronics Engineers) 802.16a communication system standard and an IEEE 802.16e communication system standard.

The IEEE 802.16a communication system and the IEEE 802.16e communication system are communication systems employing an Orthogonal Frequency Division Multiplexing (OFDM) scheme/an Orthogonal Frequency Division Access (OFDMA) scheme in order to support a broadband transmission network for a physical channel of the wireless MAN system. The IEEE 802.16a communication system only takes into consideration a single cell structure and stationary Subscriber Stations (SSs), which means the system does not in any way reflect the mobility of a SS. In contrast, the IEEE 802.16e communication system reflects the mobility of an SS in the IEEE 802.16a communication system. Here, an SS having the mobility is referred to as a Mobile Subscriber Station (MSS).

The structure of the IEEE 802.16e communication system will be described with reference to FIG. 1.

FIG. 1 is a block diagram showing the general structure of the IEEE 802.16e communication system.

Referring to FIG. 1, the IEEE 802.16e communication system has a multi-cell structure, that is, a cell 100 and a cell 150. Also, the IEEE 802.16e communication system includes a Base Station (BS) 110 controlling the cell 100, a BS 140 controlling the cell 150, and a plurality of MSSs 111, 113, 130, 151, and 153. The transmission/reception of signals between the BSs 110 and 140 and the MSSs 111, 113, 130, 151, and 153 is accomplished through an OFDM/OFDMA method. The MSS 130 from among the MSSs 111, 113, 130, 151, and 153 is located in a boundary area (i.e., handover area) between the cell 100 and the cell 150. When the MSS 130 moves into the cell 150 controlled by the BS 140 during the transmission/reception of signals with the BS 110, a serving BS of the MSS 130 changes from the BS 110 to the BS 140.

FIG. 2 is a flow diagram illustrating a general handover process by the request of the MSS in the IEEE 802.16e communication system.

Referring to FIG. 2, a serving BS 210 transmits a Mobile Neighbor Advertisement (MOB_NBR_ADV) message to an MSS 200 (step 211). The MOB_NBR_ADV message has a structure as shown in Table 1.

TABLE 1

| Syntax | Size | Notes |
|---|---|---|
| MOB_NBR_ADV_message_Format( ) { | | |
| Management Message Type=48 | 8 bits | |
| Operator ID | 24 bits | Unique ID assigned to the operator |
| Configuration Change Count | 8 bits | |
| N_NEIGHBORS | 8 bits | |
| For (j=0;j< N_NEIGHBORS;J++){ | | |
| Neighbor BS-ID | 48 bits | |
| Physical Frequency | 32 bits | |
| TLV (Type Length Variable) Encoded Neighbor Information | Variable | TLV specific |
| } | | |
| } | | |

As shown in Table 1, the MOB_NBR_ADV message includes a plurality of Information Elements (IEs), that is, the 'Management Message Type' representing the type of a transmitted message, the 'Operator ID' representing a network identifier (ID), the 'Configuration Change Count' representing the number of times by which a configuration changes, the 'N_NEIGHBORS' representing the number of neighbor BSs, the 'Neighbor BS-ID' representing IDs of the neighbor BSs, the 'Physical Frequency' representing the physical frequency of the neighbor BS, and the 'TLV Encoded Neighbor Information' representing extra information relating to the neighbor BS in addition to the information.

The MSS 200 may acquire information for the neighbor BSs by receiving the MOB_NBR_ADV message. Further, when the MSS 200 intends to scan the CINRs (Carrier to Interference and Noise Ratios) of the pilot channel signals transmitted from the neighbor BSs and the serving BS 210, the MSS 200 transmits a Mobile Scanning Interval Allocation Request (MOB_SCN-REQ) message to the serving BS 210 (step 213). The MOB_SCN-REQ message has a structure as shown in Table 2.

TABLE 2

| Syntax | Size | Notes |
|---|---|---|
| MOB_SCN_REQ_message_Format( ) { | | |
| Management Message Type=? | 8 bits | |
| Scan Duration | 12 bits | Units are frames |
| Start Frame | 4 bits | |
| } | | |

As shown in Table 2, the MOB_SCN_REQ message includes a plurality of IEs, that is, the 'Management Message Type' representing the type of a transmitted message, the 'Scan Duration' representing a scan duration for the CINRs of the pilot channel signals transmitted from the neighbor BSs, and the 'Start Frame' representing a start frame for a scanning operation. The 'Scan Duration' is constructed by the frame. In Table 2, the 'Management Message Type' of the MOB_SCN_REQ message has not yet been defined (i.e., Management Message Type=undefined). Herein, since a time point at which the MSS 200 requests the scan has no direct connection with the scanning operation for the CINRs of the pilot channel signals, the detailed description will be omitted.

Meanwhile, the serving BS 210 having received the MOB_SCN_REQ message transmits a Mobile Scanning Interval Allocation Response (MOB_SCN_RSP) message, which includes information to be scanned by the MSS 200 and includes a scan duration having values except for 0, to the MSS 200 (step 215). The MOB_SCN_RSP message has a structure as shown in table 3.

After having completed the scanning for the CINRs of the pilot channel signals received from the neighbor BSs and the serving BS 210, when the MSS 200 determines to change the serving BS to which the MSS 200 currently belongs (step 219), that is, the MSS 200 determines to change the current serving BS to a new BS different from the BS 210, the MSS 200 transmits a Mobile Subscriber Station HandOver Request (MOB_MSSHO_REQ) message to the serving BS 210 (step 221). Herein, the new BS, which is not the serving BS currently including the MSS 200 but a BS capable of being a new serving BS through the handover of the MSS 200, is referred to as a target BS. The MOB_MSSHO_REQ message has a structure as shown in Table 4.

TABLE 4

| Syntax | Size | Notes |
| --- | --- | --- |
| MOB_MSSHO_REQ_message_Format( ) { | | |
|   Management Message Type=52 | 8 bits | |
|   For (j=0;j< N_Recommended;J++) { | | N_Recommended can be derived from the known length of the message |
|     Neighbor BS-ID | 48 bits | |
|     BS S/(N+1) | 8 bits | |
|     Service level prediction | 8 bits | |
|     Estimated HO Time | 8 bits | |
|   } | | |
| } | | |

TABLE 3

| Syntax | Size | Notes |
| --- | --- | --- |
| MOB_SCN_RSP_message_Format( ) { | | |
|   Management Message Type=? | 8 bits | |
|   For(i=0;i<num_CIDs;i++){ | | num_CIDs can be determined from the length of the message {(found in the generic MAC (Medium Access Control) header) |
|     CID | 16 bits | basic CID of the MSS |
|     Duration | 12 bits | in frames |
|     Estimated time for hand-over | 8 bits | |
|     Start Frame | 4 bits | |
|   } | | |
| } | | |

As shown in Table 3, the MOB_SCN_RSP message includes a plurality of IEs, that is, the 'Management Message Type' representing the type of a transmitted message, the CID (Connection ID) of the MSS having transmitted the MOB_SCN_REQ message, the 'Duration', and the starting point of a scanning operation. In Table 3, the 'Management Message Type' of the MOB_SCN_RSP message to be transmitted has not yet been defined (i.e., Management Message Type=undefined), and the 'Duration' represents a duration for which the MSS 200 performs the pilot CINR scanning. A value of 0 for the Duration indicates a rejection of the scan request of the MSS 200.

The MSS 200 having received the MOB_SCN_RSP message containing the scanning information scans the CINRs of the pilot channel signals for neighbor BSs and the serving BS 210, which have been recognized through the reception of the MOB_NBR_ADV message, according to the parameters (i.e., Duration) contained in the MOB_SCN_RSP message (step 217).

As shown in Table 4, the MOB_MSSHO_REQ message includes a plurality of IEs, that is, the 'Management Message Type' representing the type of a transmitted message, and a result obtained by scanning the CINRs of the pilot channel signals for the serving BS and the neighbor BSs by the MSS 200. In Table 4, the 'N_Recommended' represents the number of neighbor BSs having transmitted the pilot channel signals, which have CINRs larger than preset CINRs, on the basis of the scanning result for the CINRs of the pilot channel signals of each neighbor BS. The 'N_Recommended' represents the number of neighbor BSs recommended as BSs to which the MSS 200 could be handed over to. The MOB_MSSHO_REQ message includes the IDs for each neighbor BS, which are represented by the 'N_Recommended', the CINRs of the pilot channel signals for each neighbor BS, the service level predicted to be provided to the MSS 200 by the neighbor BSs, and the Estimated HO Time predicted as the starting time of handover after the neighbor BS is selected as a target BS.

When the serving BS 210 receives the MOB_MSSHO_REQ message transmitted from the MSS 200, the serving BS 210 detects a list of possible target BSs to which the MSS 600 could be handed over to by means of the 'N_Recommended' information of the received MOB_MSSHO_REQ message (step 223). For convenience of description, the list of target BSs to which the MSS 600 could be handed over to will be called a 'handover-executable target BS list'. In FIG. 2, it is assumed that a first target BS 220 and a second target BS 230 exist in the handover-executable target BS list. Also, the handover-executable target BS list may include a plurality of target BSs. The serving BS 210 transmits a HO_PRE_NOTIFICATION message to the target BSs (i.e., the first target BS 220 and the second target BS 230) contained in the handover-executable target BS list (steps 225 and 227). The HO_PRE_NOTIFICATION message has a structure as shown in Table 5.

TABLE 5

| Field | Size | Notes |
|---|---|---|
| Global Header | 152-bit | |
| For | | |
| (j=0;j< Num Records;J++){ | | |
| MSS unique identifier | 48-bit | 48-bit unique identifier used by MSS (as provided by the MSS or by the I-am-host-of message) |
| Estimated Time to HO | 16-bit | In milliseconds, relative to the time stamp, value 0 of this parameter indicates that no actual HO is pending |
| Required BW | 8-bit | Bandwidth which is required by MSS (to guarantee minimum packet data transmission) |
| Required QoS | 8-bit | Name of Service Class representing Authorized QoSparamSet |
| } | | |
| Security field | TBD | A means to authenticate this message |
| CRC field | 32-bit | IEEE CRC-32 |

As shown in Table 5, the HO_PRE_NOTIFICATION message includes a plurality of IEs, that is, the Global Header commonly contained in messages exchanged between BSs in a backbone network, the MSS ID of the MSS 200 which is to be handed over to the first target BS 220 or the second target BS 230, the Estimated HO Time representing a time predicted as a start time of the handover by the MSS 200, the Required BW representing information on a bandwidth requested from the MSS 200 to a target BS to be a new serving BS, the Required QoS representing information on the level of a service to be provided to the MSS 200, etc. The bandwidth and the service level requested by the MSS 200 are identical to the predicted service level information recorded in the MOB_MSSHO_REQ message described in table 4.

The Global Header, which is commonly contained in the messages (equal to the HO-PRE-NOTIFICATION message) exchanged between the BSs in the backbone network, has a general structure as shown in Table 6.

TABLE 6

| Field | Size | Notes |
|---|---|---|
| Message Type=? | 8-bit | |
| Sender BS-ID | 48-bit | Base station unique identifier (Same number as broadcast on the DL_MAP message) |
| Target BS-ID | 48-bit | Base station unique identifier (Same number as broadcast on the DL_MAP message) |
| Time Stamp | 32-bit | Number of multiseconds since midnight GMT (set to 0xffffffff to ignore) |
| Num Records | 16-bit | Number of MSS identity records |

As shown in Table 6, the Global Header includes a plurality of IEs, that is, the 'Message Type' representing the type of a transmitted message, the Sender BS-ID representing a transmission BS transmitting the message, the Target BS-ID representing a reception BS receiving the message, and the Num Records representing the number of MSSs which are subjects of a record included in the message.

When the first target BS 220 and the second target BS 230 receive the HO_PRE_NOTIFICATION message from the serving BS 210, they transmit a HO_PRE_NOTIFICATION_RESPONSE message, which is a response message for the HO_PRE_NOTIFICATION message, to the serving BS 210 (steps 229 and 231). The HO_PRE_NOTIFICATION-RESPONSE message has a structure as shown in Table 7.

TABLE 7

| Field | Size | Notes |
|---|---|---|
| Global Header | 152-bit | |
| For | | |
| (j=0;j< Num_Records;J++){ | | |
| MSS unique identifier | 48-bit | 48-bit unique identifier used by MSS (as provided by the MSS or by the I-am-host-of message) |
| BW Estimated | 8-bit | Bandwidth which is provided by BS (to guarantee minimum packet data transmission) TBD how to set this field |
| QoS Estimated | 8-bit | Quality of Service level Unsolicited Grant Service (UGS) Real-time Polling Service (rtPS) Non-Real-time Polling Service nrtPS) Best Effort |
| ACK/NACK | 8 bits | Acknowledgement or Negative acknowledgement 1 is Acknowledgement which means that the neighbor BS accepts the HO-pre-notification message from the serving BS 0 is Negative Acknowledgement which means that the neighbor BS may not accept the HO-pre-notification message from the serving BS |
| } | | |
| Security field | TBD | A means to authenticate this message |
| CRC field | 32-bit | IEEE CRC-32 |

As shown in Table 7, the HO_PRE_NOTIFICATION_RESPONSE message includes a plurality of IEs, that is, the Global Header commonly included in the messages exchanged between the BSs in the backbone network as described in table 6, the MSS ID of an MSS which is to be handed over to target BSs, the ACK/NACK regarding whether the target BSs can perform handover according to the handover request of the MSS, and the bandwidth and service level information capable of being provided by each target BS when the MSS is handed over to each target BS.

Meanwhile, the serving BS 210 having received the HO_PRE_NOTIFICATION_RESPONSE messages from the first target BS 220 and the second target BS 230 analyzes the received HO_PRE_NOTIFICATION_RESPONSE message, and selects a target BS, which can optimally provide the bandwidth and the service level requested by the MSS 200 when the MSS 200 has been handed over, as a final target BS to which the MSS 200 is to be handed over. For instance, when it is assumed that the service level capable of being provided by the first target BS 220 is less than that requested by the MSS 200, and the service level capable of being provided by the second target BS 230 is identical to that requested by the MSS 200, the serving BS 210 selects the second target BS 230 as the final target BS to which the MSS 200 is to be handed over. Accordingly, the serving BS 210 transmits a HO_CONFIRM message to the second target BS 230 as a response message for the HO_PRE_NOTIFICATION_RESPONSE message (step 233). The HO_CONFIRM message has a structure as shown in Table 8.

TABLE 8

| Field | Size | Notes |
| --- | --- | --- |
| Global Header | 152-bit | |
| For | | |
| (j=0;j< Num_Records;J++){ | | |
|    MSS unique identifier | 48-bit | 48-bit universal MAC address of the MSS (as provided to the BS on the RNG-REQ message) |
|    BW Estimated | 8-bit | Bandwidth which is provided by BS (to guarantee minimum packet data transmission) TBD how to set this field |
|    QoS Estimated | 8-bit | Quality of Service level Unsolicited Grant Service (UGS) Real-time Polling Service (rtPS) Non-Real-time Polling Service (nrtPS) Best Effort Service (BE) |
| } | | |
| Security field | TBD | A means to authenticate this message |
| CRC field | 32-bit | IEEE CRC-32 |

As shown in Table 8, the HO_CONFIRM message includes a plurality of IEs, that is, the Global Header commonly included in the messages exchanged between the BSs in the backbone network as described in table 6, an MSS ID of an MSS which is to be handed over to the selected target BS, and the bandwidth and service level information capable of being provided from the target BS when the MSS is handed over to the selected target BS.

Also, the serving BS 210 transmits a BS HandOver Response (MOB_BSHO_RSP) message to the MSS 200 as a response message for the MOB_MSSHO_REQ message (step 235). Herein, the MOB_BSHO_RSP message includes information on the target BS to which the MSS 200 is to be handed over. The MOB_BSHO_RSP message has a structure as shown in Table 9.

TABLE 9

| Syntax | Size | Notes |
| --- | --- | --- |
| MOB_BSHO_RSP_message_Format( ) { | | |
|   Management Message Type=53 | 8 bits | |
|   Estimated HO time | 8 bits | |
|   For (j=0;j< N_Recommended;J++){ | | Neighbor base stations shall be presented in an order such that the first presented is the one most recommended and the last presented is the least recommended. N_Recommended can be derived from the known length of the message. |
|     Neighbor BS-ID | 48 bits | |
|     Service level prediction | 8 bits | |
|   } | | |
| } | | |

As shown in Table 9, the MOB_BSHO_RSP message includes a plurality of IEs, that is, the 'Management Message Type' representing the type of a transmitted message, the Estimated HO time predicted as a start time of a handover procedure, and the result for the target BSs selected by the serving BS. Further, the 'N_Recommended' of the MOB_BSHO_RSP message represents the number of target BSs, which satisfy the bandwidth and the service level requested by the MSS, among target BSs on the handover-executable target BS list. The MOB_BSHO_RSP message includes the IDs of each target BS represented by the 'N_Recommended' and the level of the service predicted to be provided from each target BS to the MSS. In FIG. 2, the MOB_HO_RSP message finally includes only information on the second target BS 230 from among the target BSs on the handover-executable target BS list. However, if there exist multiple target BSs capable of providing the bandwidth and service level requested by the MSS 200 from among the target BSs on the handover-executable target BS list, the MOB_BSHO_RSP message includes information on the multiple target BSs.

Further, the MSS 200 having received the MOB_BSHO_RSP message analyzes the 'N_Recommended' information contained in the MOB_BSHO_RSP message and selects the target BS to which the MSS 200 is to be handed over. Then, the MSS 200 having selected the target BS to which the MSS 200 is to be handed over transmits a Mobile Handover Indication (MOB_HO_IND) message to the serving BS 210 as a response message for the MOB_BSHO_RSP message (step 237). The MOB_HO_IND message has a structure as shown in Table 10.

TABLE 10

| Syntax | Size | Notes |
| --- | --- | --- |
| MOB_HO_IND_message_Format( ) { | | |
|   Management Message Type=54 | 8 bits | |
|   reserved | 6 bits | Reserved; shall be set to zero |
|   HO_IND_type | 2 bits | 00: Serviing BS release 01: HO cancel 10: HO reject 11: reserved |
|   Target_BS_ID | 48 bits | Applicable only when HO_IND_type is set to 00 |
|   HMAC Tuple | 21 bytes | See 11.4.11 |
| } | | |

As shown in Table 10, the MOB_HO_IND message includes a plurality of IEs, that is, the 'Management Message Type' representing the type of a transmitted message, the 'HO_IND_type' representing a determination, cancellation or rejection for handover to the final target BS selected by the MSS, the 'Target_BS_ID' representing an ID of the target BS selected by the MSS when the handover is determined, and the 'HMAC Tuple ' for authenticating the MOB_HO_IND message. In the 'HO_IND_type', when the MSS has determined to perform the handover to the final target BS, the MSS transmits the MOB_HO_IND message in which the 'HO_IND_type' has been set to 00. When the MSS has determined to cancel the handover to the final target BS, the MSS transmits the MOB_HO_IND message in which the 'HO_IND_type' has been set to 01. When the MSS has determined to reject the handover to the final target BS, the MSS transmits the MOB_HO_IND message in which the 'HO_IND_type' has been set to 10. The serving BS 210 having received the MOB_HO_IND message in which the 'HO_IND_type' has been set to 10 creates a new the handover-executable target BS list and then retransmits the MOB_BSHO_RSP message to the MSS 200.

Further, the serving BS 210 having received the MOB_HO_IND message in which the 'HO_IND_type' has been set to 00 recognizes that the MSS 200 is to be handed over to the target BS (i.e., second target BS 230) contained in the MOB_HO_IND message. Then, the serving BS 210 releases the connection information currently set with the MSS 200 or retains the connection information set with the MSS 200 over a preset time until a notification representing the complete end of the handover procedure is received from the target BS (i.e., second target BS 230) finally selected by the MSS 200 (step 239). In this way, after the MSS 200 has transmitted the MOB_HO_IND message to the serving BS 210, the MSS 200 performs a remaining handover operation with the second target BS 230.

FIG. 3 is a flow diagram illustrating a general handover process by the request of the BS in the IEEE 802.16e communication system.

Before a description about FIG. 3 is given, the handover process by the request of the BS occurs when the BS is overloaded and requires a load sharing for dispersing the load of the BS to neighbor BSs, or the BS must cope with the change of the uplink status of an MSS. Referring to FIG. 3, a serving BS 310 transmits a MOB_NBR_ADV message to an MSS 300 (step 311). The MSS 300 may obtain information on the neighbor BSs by receiving the MOB_NBR_ADV message.

When the serving BS 310 detects the need for a handover of the MSS 300 controlled by the serving BS 310 (step 313), the serving BS 310 transmits the HO_PRE_NOTIFICATION messages to the neighbor BSs (steps 315 and 317). Herein, the HO_PRE_NOTIFICATION message includes information for the bandwidth and the service level which must be provided to the MSS 300 from a target BS which is to be a new serving BS of the MSS 300. In FIG. 3, it is assumed that the neighbor BSs of the serving BS 310 are a first target BS 320 and a second target BS 330.

After receiving the HO_PRE_NOTIFICATION messages, each of the first target BS 320 and the second target BS 330 transmit the HO_PRE_NOTIFICATION_RESPONSE message to the serving BS 310 as a response message of the HO_PRE_NOTIFICATION message (steps 319 and 321). The HO_PRE_NOTIFICATION_RESPONSE message includes the ACK/NACK, which represents if the target BSs can perform the handover requested by the serving BS 310, and the bandwidth and service level information capable of being provided to the MSS 300 as described in Table 7.

After the serving BS 310 receives the HO_PRE_NOTIFICATION_RESPONSE messages from the first target BS 320 and the second target BS 330, the serving BS 310 selects the target BSs capable of providing the bandwidth and service level requested by the MSS 300. For example, when it is assumed that the service level capable of being provided by the first target BS 320 is less than that requested by the MSS 300, and the service level capable of being provided by the second target BS 330 is equal to that requested by the MSS 300, the serving BS 310 selects the second target BS 330 as a final target BS to which the MSS 300 can be handed over. After selecting the second target BS 330 as the target BS to which the MSS 300 can be handed over, the serving BS 310 transmits a Mobile BS HandOver Request (MOB_BSHO_REQ) message including the handover-executable target BS list to the MSS 300 (step 323). The handover-executable target BS list may include multiple target BSs. The MOB_BSHO_REQ message has a structure as shown in table 11.

TABLE 11

| Syntax | Size | Notes |
| --- | --- | --- |
| MOB_BSHO_REQ_message_Format( ) { | | |
|   Management Message Type=51 | 8 bits | |
|   For (j=0;j< N_Recommended;J++){ | | N_Recommended can be derived from the known length of the message |
|     Neighbor BS-ID | 48 bits | |
|     Service level prediction | 8 bits | |
|   } | | |
| } | | |

As shown in Table 11, the MOB_BSHO_REQ message includes a plurality of IEs, that is, the 'Management Message Type' representing the type of a transmitted message, and information on the target BSs selected by the serving BS 310. In table 11, the 'N_Recommended' represents the number of neighbor BSs selected as the target BSs to which the MSS 300 can be handed over by the serving BS 310. Further, the MOB_BSHO_REQ message includes the IDs for each neighbor BS, which are represented by the 'N_Recommended', and the information on the bandwidth and service level capable of being provided to the MSS 300 from the neighbor BSs.

The MSS 300 having received the MOB_BSHO_REQ message recognizes that the handover has been requested by the serving BS 310, and selects a final target BS to which the MSS 300 is to be handed over with reference to the 'N_Recommended' information contained in the MOB_BSHO_REQ message. Before selecting the final target BS, when the MSS 300 intends to scan the CINRs of the pilot channel signals transmitted from the serving BS 310 and the neighbor BSs, the MSS 300 transmits the MOB_SCN_REQ message to the serving BS 310 (step 325). Herein, since a point in time at which the MSS 300 requests the scan has no direct connection to the scanning operation for the CINRs of the pilot channel signals, the detailed description will be omitted. The serving BS 310 having received the MOB_SCN_REQ message transmits the MOB_SCN_RSP message including information to be scanned by the MSS 300 to the MSS 300 (step 327). The MSS 300 having received the MOB_SCN_RSP message including the scanning information scans the CINRs of the pilot channel signals for the neighbor BSs, which have been recognized through the reception of the MOB_NBR_ADV message, the target BSs to which the MSS 300 can be handed over, which have been recognized through the reception of the MOB_BSHO_REQ message, and the serving BS 310 according to the parameters (i.e., Duration) included in the MOB_SCN_RSP message (step 329).

After selecting the final target BS to which the MSS 300 is to be handed over, the MSS 300 transmits the MOB_MSS- HO_RSP message the serving BS 310 as a response message for the MOB_BSHO_REQ message (step 331). The MOB_MSSHO_RSP message has a structure as shown in Table 12.

TABLE 12

| Syntax | Size | Notes |
|---|---|---|
| MOB_MSSHO_RSP_message_Format( ) { | | |
| Management Message Type=54 | 8 bits | |
| Estimated HO Time | 8 bits | |
| For (j=0;j< N_Recommended;J++){ | | N_Recommended can be derived from the known length of the message |
| Neighbor BS-ID | 48 bits | |
| BS S/(N+1) | 8 bits | |
| } | | |
| } | | |

As shown in Table 12, the MOB_MSSHO_RSP message includes a plurality of IEs, that is, the 'Management Message Type' representing the type of a transmitted message, the Estimated HO Time predicted as a start time of the handover procedure, and information on the target BSs selected by the MSS. In table 12, the 'N_Recommended' represents the number of the neighbor BSs selected as the target BSs to which the MSS can be handed over. Further, the MOB_MSSHO_RSP message includes the IDs for each neighbor BS, which are represented by the 'N_Recommended', and the information on the service level capable of being provided to the MSS from the neighbor BSs.

The serving BS 310 transmits the HO_CONFIRM message to the neighbor BS selected as the final target BS by the MSS 300 in response to the HO_PRE_NOTIFICATION-RESPONSE message (step 333). The MSS 300 having selected the final target BS transmits the MOB_HO_IND message in which the 'HO_IND_type' has been set to 00 to the serving BS 310 (step 335). After receiving the MOB_HO_IND message, the serving BS 310 recognizes again that the MSS 300 is to be handed over to the final target BS included in the MOB_HO_IND message. Then, the serving BS 310 releases connection information currently set with the MSS 300, or retains the connection information set with the MSS 300 during a preset time until a notification representing the completion of the handover procedure is received from the target BS (i.e., second target BS 330) finally selected by the MSS 200 (step 337). In this way, after the MSS 300 has transmitted the MOB_HO_IND message to the serving BS 310, the MSS 300 performs a remaining handover operation with the second target BS 330.

FIG. 4 is a flow diagram illustrating a general network reentry process according to the handover of the MSS in the IEEE 802.16e communication system.

Referring to FIG. 4, an MSS 400 changes the connection to a final target BS 450 and acquires the downlink synchronization with the final target BS 450. Then, the MSS 400 receives a DownLink_MAP (DL_MAP) message transmitted from the final target BS 450 (step 411). The DL_MAP message includes parameters relating to a downlink of the final target BS 450. The MSS 400 receives an UpLink_MAP (UL_MAP) message transmitted from the final target BS 450 (step 413). The UL_MAP message is a message including parameters relating to an uplink of the final target BS 450. Further, the UL_MAP message includes an FAST_UL_RANGING_IE which the final target BS 450 has assigned to support an FAST_UL_RANGING of the MSS 400 performing the handover. The reason for the final target BS 450 to assign the FAST_UL_RANGING IE to the MSS 400 is to minimize a delay which may occur when the MSS 400 performs the handover. Accordingly, the MSS 400 may perform an initial ranging with the final target BS 450 in a contention-free scheme according to the FAST_UL_RANGING_IE. Herein, the FAST UL RANGING IE included in the UL_MAP message is as shown in Table 13.

TABLE 13

| Syntax | Size | Notes |
|---|---|---|
| Fast_UL_ranging_IE { | | |
| MAC address | 48 bits | MSS MAC address as provided on the RNG_REQ message on initial system entry. |
| UIUC | 4 bits | UIUC = 15. A four-bit code used to define the type of uplink access and the burst type associated with that access. |
| OFDM Symbol offset | 10 bits | The offset of the OFDM symbol in which the burst starts, the offset value is defined in units of OFDM symbols and is relevant to the Association Start Time field given in the UL_MAP message. |
| Subchannel offset | 6 bits | The lowest index OFDMA subchannel used for carrying the burst, starting from subchannel 0. |
| No OFDM Symbol | 10 bits | The number of OFDM symbols that are used to carry the UL Burst. |
| No Subchannels | 6 bits | The number of OFDMA subchannels with subsequent indexes, used to carry the burst. |
| Reserved | 4 bits | |
| } | | |

The FAST_UL_RANGING_IE in Table 13 includes information for the MAC address of an MSS which is to obtain a ranging opportunity, the Uplink Interval Usage Code (UIUC) for providing region information including a start offset value for the FAST_UL_RANGING, and the offset of a ranging opportunity interval of a contention-free scheme/the number of symbols/the number of subchannels, which are assigned to the MSS 400, etc. The MAC address of the MSS 400 is notified to the final target BS 450 through a message such as the HO_PRE_NOTIFICATION message, the HO_PRE_NOTIFICATION_RESPONSE message and the HO_CONFIRM message exchanged between the serving BS and the final target BS in the backbone network in the handover process described in FIGS. 2 and 3.

The MSS 400 having received the UL_MAP message transmits a Ranging Request (RNG_REQ) message to the final target BS 450 according to the FAST_UL_RANGING_IE (step 415). The final target BS 450 having received the RNG_REQ message transmits a Ranging Response (RNG_RSP) message including the information for compensating for a frequency, a time and a transmit power for the ranging to the MSS 400 (step 417).

The MSS 400 and the final target BS 450 having completed the initial ranging perform a re-authorization operation (MSS RE_AUTHORIZATION) for the MSS 400 (step 419). In the performance of the re-authorization operation, when a security context exchanged between a serving BS to which the MSS 400 previously belongs and the final target BS 450 has not changed, the final target BS 450 uses the security context as is. A backbone network message for providing the security context information of the MSS 400, that is, an MSS-information-response (MSS_INFO_RSP) message has a structure as shown in Table 14.

TABLE 14

| Field | Size | Notes |
|---|---|---|
| Global Header | 152-bit | |
| For (j=0;j< Num_Records; J++){ | | |
|   MSS unique identifier | 48-bit | 48-bit unique identifier used by MSS (as provided by the MSS or by the I-am-host-of message) |
|   N_NSIE | | Number of Network Service Information Elements |
|   For (k=0;k< N_NSIEk++){ | | |
|     Field Size | 16-bit | Size of TLV encoded information field below |
|     TLV encoded information | Variable | TLV information as followed on a DSA-REQ MAC message |
|   } | | |
|   N_SAIE | | Number of Security Association Information Elements |
|   For (k=0;k< N_SAIE; k++){ | | |
|     Field Size | 16-bit | Size of TLV encoded information field below |
|     TLV encoded information | Variable | TLV information as followed on a PKM-xxx MAC message |
|   } | | |
|   N_MSS_CAP | | Number of MSS Capabilities |
|   For (k=0;k<N_MSS_CAP; k++){ | | |
|     Field Size | 16-bit | Size of TLV encoded information field below |
|     TLV encoded information | Variable | TLV information as followed on a SBC-REQ MAC message |
|   } | | |
|   TLV encoded information | Variable | TLV information as followed on a SBC-REQ MAC message |
| } | | |
| Security field | TBD | A means to authenticate this message |
| CRC field | 32-bit | IEEE CRC-32 |

As shown in Table 14, the MSS_INFO_RSP message includes the ID information of MSSs registered in the serving BS, the security context information such as Security Association Information for each MSS, the Network Service Information for each MSS, the capability information of each MSS, etc.

When the re-authorization operation has been completed for the final target BS 450 and the MSS 400, the MSS 400 transmits a Registration Request (REG_REQ) message to the final target BS 450 (step 421). The REG_REQ message includes the registration information of the MSS 400. The final target BS 450 transmits a Registration Response (REG_RSP) message to the MSS 400 in response to the REG_REQ message (step 423). The final target BS 450 detects the registration information of the MSS 400 contained in the received REG_REQ message, thereby recognizing that the MSS 400 is an MSS having performed the handover. Accordingly, the final target BS 450 maps the connection setup information of the MSS 400 in the previous serving BS with the connection setup information of the MSS 400 in the final target BS 450. Further, the final target BS 450 inserts a TLV value, which is used for resetting a service flow capable of being actually received, into the MSS_INFO_RSP message and then transmits the MSS_INFO_RSP message to the MSS 400. Table 15 shows the structure of the TLV including mapping information for connection setup in the serving BS and the final target BS 450.

TABLE 15

| Name | Type (1 byte) | Length (1 byte) | Value (Variable-length) |
|---|---|---|---|
| New_CID | 2.1 | 2 | New CID after hand-over to new BS |
| Old_CID | 2.2 | 2 | Old CID before hand-over from old BS |
| Connection Info | 2.3 | Variable | If any of the service flow parameters change, then those service flow parameters and CS parameter encoding TLVs that have changed will be added. Connection_Info is a compound TLV value that encapsulates the Service Flow Parameters and the CS parameter that have changed for the service. All the rules and settings that apply to the parameters when used in the DSC-RSP message apply to the contents encapsulated in this TLV. |

In Table 15, the TLV contained in the REG_RSP message provides a CID used in the serving BS before the MSS 400 performs the handover, and the CID information which is to be used in the final target BS 450 after the MSS 400 has performed the handover. Further, when the final target BS 450 provides a service different from a service flow provided from the serving BS before the handover, the TLV includes information for any changed service parameters.

The MSS 400 completes the network reentry procedure with the final target BS 450 and performs a normal communication service through the final target BS 450 (step 425).

SUMMARY OF THE INVENTION

As described above, when the CINR of the pilot signal of the serving BS is reduced to the extent that communication with the current serving BS cannot be continued in the IEEE 802.16e communication system, the MSS is handed over to a neighbor BS (i.e., final target BS) that is different from the serving BS according to the request of the MSS or the request of a BS. However, while the MSS performs the network reentry operation with the final target BS in the IEEE 802.16e communication system, when the CINR of the pilot signal transmitted from the final target BS is reduced and a communication service through the final target BS is impossible, the MSS can change the connection to the serving BS.

Further, after the MSS has changed the connection to the serving BS due to a pingpong effect occurred during the handover to the final target BS, the MSS must carry out an initial connection setup procedure with the serving BS, that is, the network reentry operation, in order to reopen a communication service through the serving BS. Accordingly, when the pingpong effect frequently occurs during the handover by the MSS, the MSS must frequently carry out the network reentry operation. Therefore, a service may be delayed. Further, the frequent execution of the network reentry operation increases a signaling load, thereby deteriorating the entire performance of the system.

Accordingly, the present invention has been made to solve at least the above-mentioned problems occurring in the prior art, and it is an object of the present invention is to provide a system and a method for performing a handover to prevent a pingpong effect by recognizing in advance the occurrence of the pingpong effect during the handover in a BWA communication system.

It is another object of the present invention is to provide a system and a method for performing a handover to minimize a communication service delay when a pingpong effect occurs in a BWA communication system.

In order to accomplish the aforementioned object, according to one aspect of the present invention, there is provided a method for performing a handover by a Mobile Subscriber Station (MSS) in a Broadband Wireless Access (BWA) communication system including a serving Base Station (BS) for providing a service to the MSS and a target BS adjacent to the serving BS. The method comprises the steps of receiving a handover request message from the serving BS, the handover request message including a resource remain type field representing whether connection information having been set between the serving BS and the MSS is retained and recognizing whether the serving BS retains the connection information according to a value of the resource remain type field.

In order to accomplish the aforementioned object, according to another aspect of the present invention, there is provided a method for performing a handover by a Mobile Subscriber Station (MSS) in a Broadband Wireless Access (BWA) communication system including a serving Base Station (BS) for providing a service to the MSS and a target BS adjacent to the serving BS. The method comprises the steps of requesting the handover to the serving BS; receiving a handover response message from the serving BS, the handover response message including a resource remain type field representing whether connection information having been set between the serving BS and the MSS is retained; and recognizing whether the serving BS retains the connection information according to a value of the resource remain type field.

In order to accomplish the aforementioned object, according to a further aspect of the present invention, there is provided a method for performing a handover by a serving Base Station (BS) for providing a service to a Mobile Subscriber Station (MSS) in a Broadband Wireless Access (BWA) communication system including a target BS adjacent to the serving BS. The method comprises the steps of transmitting a handover request message to the MSS, the handover request message including a resource remain type field representing whether connection information having been set between the serving BS and the MSS is retained; receiving a handover indication message from the MSS; and retaining the connection information according to a value of the resource remain type field.

In order to accomplish the aforementioned object, according to still another aspect of the present invention, there is provided a method for performing a handover by a serving Base Station (BS) for providing a service to a Mobile Subscriber Station (MSS) in a Broadband Wireless Access (BWA) communication system including a target BS adjacent to the serving BS. The method comprises the steps of receiving a handover request message from the MSS; transmitting a handover response message to the MSS, the handover response message including a resource remain type field representing whether connection information having been set with the MSS is retained; receiving a handover indication message from the MSS; and retaining the connection information according to a value of the resource remain type field.

In order to accomplish the aforementioned object, according to still another aspect of the present invention, there is provided a handover method for minimizing a service delay due to a pingpong effect in a Broadband Wireless Access (BWA) communication system including a Mobile Subscriber Station (MSS), a serving Base Station (BS) communicating with the MSS, and a plurality of neighbor BSs. The method comprises the steps of a) requesting to the serving BS a handover when it is detected that handover must be performed from the serving BS to a final target BS which is one of the neighbor BSs; b) detecting information for at least two candidate target BSs, on of which is selected as the final target BS, according to the handover request, the information being received from the serving BS; c) measuring CINR (Carrier to Interference and Noise Ratio) values transmitted from each of the candidate target BSs; d) comparing the measured CINR values with a first predetermined threshold value and excluding a first candidate target BS, which transmits a reference signal having a CINR value less than the first threshold value, from the candidate target BSs when CINR values less than the first threshold value exist; and e) determining the final target BS in the candidate target BSs excluding the first candidate target BS and notifying the serving BS of a handover to the final target BS.

In order to accomplish the aforementioned object, according to yet another aspect of the present invention, there is provided a handover method for minimizing a service delay due to a pingpong effect in a Broadband Wireless Access (BWA) communication system including a Mobile Subscriber Station (MSS), a serving Base Station (BS) communicating with the MSS, and a plurality of neighbor BSs. The method comprising the steps of a) receiving a handover request including information for at least two candidate target BSs from the serving BS, one of the candidate target BSs being selected as a final target BS by the serving BS, the final target BS being one of the neighbor BSs, and detecting the information; b) measuring CINR (Carrier to Interference and Noise Ratio) values transmitted from each of the candidate target BSs; c) comparing the measured CINR values with a first predetermined threshold value and excluding a first candidate target BS, which transmits a reference signal having the CINR value less than the first threshold value, from the candidate target BSs when CINR values less than the first threshold value exist; and d) determining the final target BS in the candidate target BSs excluding the first candidate target BS and notifying the serving BS of handover to the final target BS.

In order to accomplish the aforementioned object, according to yet another aspect of the present invention, there is provided a handover method for minimizing a service delay due to a pingpong effect in a Broadband Wireless Access (BWA) communication system including a Mobile Subscriber Station (MSS), a serving Base Station (BS) communicating with the MSS, and a plurality of neighbor BSs. The method comprises the steps of a) one of deleting connection information of the MSS and retaining the connection information during a preset time, when the serving BS receives a notification representing that the MSS is to be handed over to a target BS which is a specific neighbor BS of the neighbor BSs; b) changing a connection to the serving BS when the MSS recognizes an occurrence of a pingpong effect during a network reentry procedure with the target BS; c) receiving one of a handover request message and a handover response message from the serving BS; d) detecting and recognizing if the connection information for the MSS is retained, which is contained in each message, according to reception of each message; and e) performing only an initial ranging procedure and reopening communication with the serving BS when the serving BS retains the connection information for the MSS.

In order to accomplish the aforementioned object, according to yet another aspect of the present invention, there is provided a handover system for minimizing a service delay due to a pingpong effect in a Broadband Wireless Access (BWA) communication system including an MSS (Mobile Subscriber Station), a serving BS (Base Station) for communicating with the MSS, and a plurality of neighbor BSs. The system comprises a MSS for requesting handover to a serving BS when it is detected that handover must be performed from the serving BS to a final target BS which is one of the neighbor BSs, detecting information for at least two candidate target BSs, which are selected as the final target BS, according to the handover request, the information being received from the serving BS, measuring CINR (Carrier to Interference and Noise Ratio) values transmitted from each of the candidate target BSs, comparing the measured CINR values with a first predetermined threshold value and excluding a first candidate target BS, which transmits a reference signal having a CINR value less than the first threshold value, from the candidate target BSs when CINR values less than the first threshold value exist, and determining the final target BS in the candidate target BSs excluding the first candidate target BS and notifying the serving BS of handover to the final target BS; and a serving BS for receiving the request of the MSS, transmitting the information for at least two candidate target BSs, which are selected as the final target BS by the MSS, and receiving a notification representing that the MSS is to be handed over to the final target BS from the MSS.

In order to accomplish the aforementioned object, according to yet another aspect of the present invention, there is provided a handover system for minimizing a service delay due to a pingpong effect in a Broadband Wireless Access (BWA) communication system including an MSS (Mobile Subscriber Station), a serving BS (Base Station) for communicating with the MSS, and a plurality of neighbor BSs. The system comprises a MSS for receiving a handover request including information for at least two candidate target BSs from a serving BS, the candidate target BSs being selected as a final target BS by the serving BS, the final target BS being one of the neighbor BSs, and detecting the information, measuring CINR (Carrier to Interference and Noise Ratio) values transmitted from each of the candidate target BSs, comparing the measured CINR values with a first predetermined threshold value and excluding a first candidate target BS, which transmits a reference signal having the CINR value less than the first threshold value, from the candidate target BSs when CINR values less than the first threshold value exist, and determining the final target BS in the candidate target BSs excluding the first candidate target BS and notifying the serving BS of handover to the final target BS; and a serving BS for requesting the handover of the MSS and receiving information for the final target BS from the MSS.

In order to accomplish the aforementioned object, according to yet another aspect of the present invention, there is provided a system for performing a handover in a Broadband Wireless Access (BWA) communication system including a Mobile Subscriber Station (MSS), a serving Base Station (BS) for providing a service to the MSS, and a target BS adjacent to the serving BS. The system comprises a MSS for requesting the handover to the serving BS, receiving a handover response message from the serving BS, the handover response message including a resource remain type field representing whether preset connection information is retained, and recognizing whether the serving BS retains the connection information according to a value of the resource remain type field; and a serving BS for receiving a handover request message from the MSS, transmitting the handover response message to the MSS, the handover response message including the resource remain type field representing whether the connection information having been set with the MSS is retained, receiving a handover indication message from the MSS, and retaining the connection information according to the value of the resource remain type field.

In order to accomplish the aforementioned object, according to yet another aspect of the present invention, there is provided a system for performing a handover in a Broadband Wireless Access (BWA) communication system including a Mobile Subscriber Station (MSS), a serving Base Station (BS) for providing a service to the MSS, and a target BS adjacent to the serving BS. The system comprises a MSS for receiving a handover request message from the serving BS, the handover request message including a resource remain type field representing whether connection information having been set with the serving BS is retained, and recognizing whether the serving BS retains the connection information according to a value of the resource remain type field; and a serving BS for transmitting the handover request message to the MSS, the handover request message including the resource remain type field representing whether the connection information having been set with the MSS is retained, receiving a handover indication message from the MSS, and retaining the connection information according to the value of the resource remain type field.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment according to the present invention will be described with reference to the accompanying drawings. In the following description of the present invention, a detailed description of known functions and configurations incorporated herein will be omitted when it may obscure make the subject matter of the present invention.

The present invention proposes a scheme for recognizing the occurrence of a pingpong effect and minimizing a service delay due to the pingpong effect while an MSS performs a handover operation with a target BS to which the MSS is to be handed over in an IEEE 802.16e communication system which is a BWA communication system. The present invention proposes a scheme for recognizing the occurrence of the pingpong effect and preventing the pingpong effect when the MSS cancels the handover to the target BS during performance of the handover operation with the target BS and then changes the connection to a serving BS. The present invention proposes a scheme for allowing the serving BS to retain connection information of the MSS according to channel conditions, so that the MSS can quickly perform a connection setup according to the handover. The IEEE 802.16e communication system is a BWA communication system using an OFDM scheme and an OFDMA scheme. The IEEE 802.16e communication system using the OFDM/OFDMA scheme transmits physical channel signals by means of multiple sub-carriers, thereby allowing data to be transmitted at a high speed. Further, the IEEE 802.16e communication system is a communication system supporting the mobility of the MSS by supporting a multi-cell structure.

Figure 5:
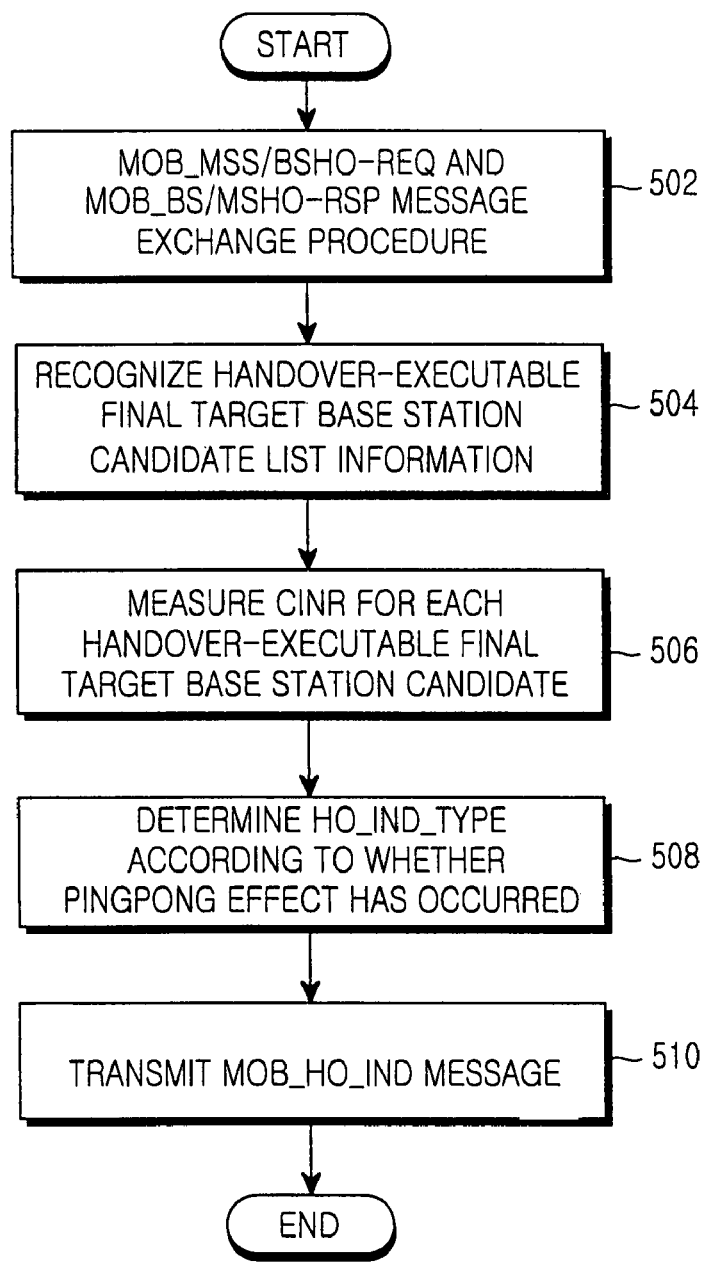
FIG. 5 is a flow diagram illustrating an operation process of an MSS when a pingpong effect occurs during a handover in an IEEE 802.16e communication system according to an embodiment of the present invention.

FIG. 5 is a flow diagram illustrating an operation process of the MSS when the pingpong effect occurs during a handover in the IEEE 802.16e communication system according to an embodiment of the present invention.

Referring to FIG. 5, in step 502, the MSS performs a message exchange procedure relating to a series of handover requests and responses. That is, the MSS transmits a MOB_MSSHO_REQ message to a BS (i.e., serving BS) providing a service to the MSS and then receives a MOB_BSHO_RSP message as a response for the MOB_MSSHO_REQ message. Also, the MSS receives a MOB_BSHO_REQ message from the serving BS and then transmits a MOB_MSSHO_RSP message as a response for the MOB_BSHO_REQ message. Then, step 504 is performed. In step 504, the MSS detects and recognizes handover-executable final target BS candidate list information contained in the handover request or response message transmitted/received to/from the serving BS. Then, step 506 is performed. In step 506, the MSS measures a CINR for each handover-executable final target BS candidate. Then, step 508 is performed. In step 508, the MSS determines a MOB_HO_IND_type according to whether the MSS recognizes the occurrence of a pingpong effect which will be described later. Then, step 510 is performed. In step 510, the MSS transmits a MOB_HO_IND message including information regarding the determined type to the serving BS.

Figure 6:
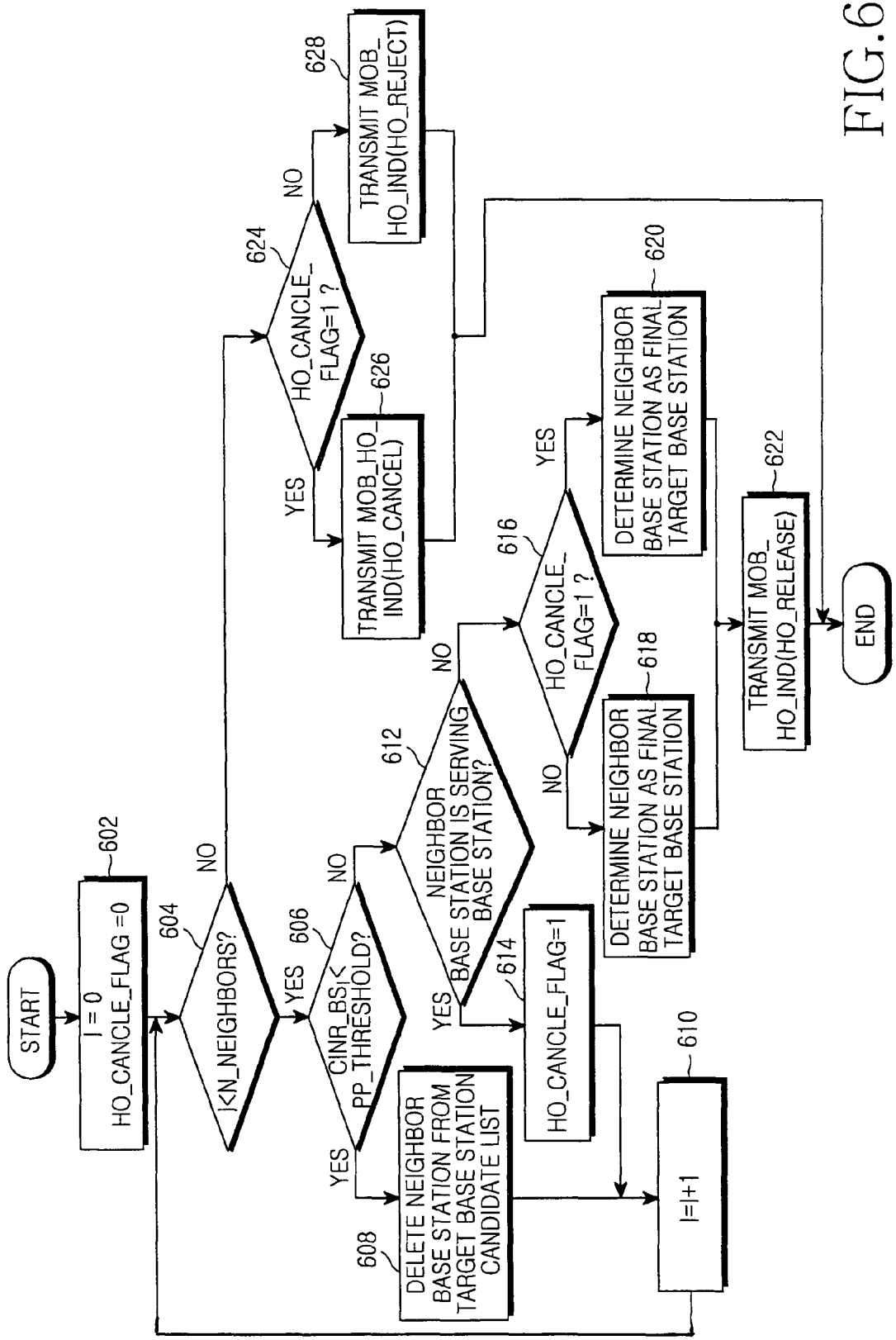
FIG. 6 is a flow diagram illustrating an operation process of an MSS according to whether the MSS recognizes the occurrence of an pingpong effect when a handover situation occurs in an IEEE 802.16e communication system according to an embodiment of the present invention.

FIG. 6 is a flow diagram illustrating an operation process of the MSS according to whether the MSS recognizes the occurrence of the pingpong effect when a handover situation occurs in an IEEE 802.16e communication system according to an embodiment of the present invention.

Referring to FIG. 6, in step 602, when the MSS recognizes the occurrence of a situation in which the handover must be performed, the MSS sets a counter initial value i for neighbor BSs to 0 and sets a HandOver cancel flag (HO_CANCEL_FLAG) to 0. Then, step 604 is performed. That is, the MSS performs an initialization procedure for measuring the CINR values for each of the neighbor BS contained in the handover-executable final target BS candidate list. The HO_CANCEL_FLAG is a flag for reporting that remaining neighbor BSs except for a serving BS from among the neighbor BSs contained in the handover-executable final target BS candidate list that have not been selected as final target BSs. In step 604, the MSS determines if the CINR values have been measured for all of the BSs in the final target BS candidate list satisfying the predetermined conditions from among the neighbor BSs aligned in a sequence having better factors synthetically reflecting a QoS, a CINR, etc. As a result of the determination, when there exist BSs for which the CINR values has not been measured, that is, i<N_Neighbors, step 606 is performed.

In step 606, the MSS examines whether the CINR value (CINR_BS) is less than a preset pingpong threshold value (PP_THRESHOLD) from the highly-ranked BS from among the aligned final target BS candidates. Herein, the PP_THRESHOLD is set to have a value greater than a handover threshold value (HO_THRESHOLD) which is a threshold value used to determine that the MSS must be handed over from the serving BS including the MSS to another BS other than the serving BS. In other words, the PP_THRESHOLD is set to allow the MSS to be handed over to a reliable target BS. The PP_THRESHOLD is set to prevent an unnecessary handover due to the pingpong effect. As a result of the examination, when the CINR_BS is less than the PP_THRESHOLD, step 608 is performed.

In step 608, the MSS deletes the neighbor BS from the final target BS candidate list because the CINR_BS is less than the PP_THRESHOLD, and step 610 is performed. In step 610, the MSS increases the i value by 1 and repeats the steps from step 604 for BSs in the next sequence on the list. If the CINR of the neighbor BS is greater than or equal to the PP_THRESHOLD in step 606, that is, the CINR_BS≧ the PP_THRESHOLD, step 612 is performed. In step 612, the MSS determines if the BS is the neighbor BS or the serving BS. As a result of the determination, when the BS is the serving BS, the MSS sets in step 614 the HO_CANCEL_FLAG to a value of 1, and step 610 is performed. In contrast, when the BS is the neighbor BS, step 616 is performed. In step 616, the MSS determines if the HO_CANCEL_FLAG having been set up to now has a value of 1. As a result of the determination, when the HO_CANCEL_FLAG does not have a value of 1, step 618 is performed. In contrast, when the HO_CANCEL_FLAG has a value of 1, step 620 is performed. In step 618, the MSS determines that the BS is a final target BS to which the MSS is to be handed over, and step 622 is performed. In step 622, the MSS transmits a MOB_HO_IND_type message (type=00) to the current serving BS so as to report the handover to the determined final target BS.

In step 620, the MSS sets the HO_CANCEL_FLAG to have a value of 0 again and determines the BS as the final target BS. Then, step 622 is performed.

As a result of the checking in step 606 based on the measurement of the CINRs for all of the BSs in the final target candidate list including the serving BS, when the MSS has not found a BS having a CINR value exceeding the PP_THRESHOLD, the process proceeds to step 624 from step 604. In step 624, the MSS determines if the HO_CANCEL_FLAG is set to 1. As a result of the determination, when the HO_CANCEL_FLAG has been set to 1, step 626 is performed. In step 626, the MSS transmits a HO_IND message in which the HO_IND_type has been set to 01, that is, the HO_IND message including handover cancellation (HO_CANCEL) information, to the serving BS. Therefore, the MSS notifies the serving BS of a handover cancellation. In step 624, when the HO_CANCEL_FLAG has not been set to 1, step 628 is performed. That is, in step 628, the MSS transmits a HO_IND message in which the HO_IND_type is set to 01, that is, the HO_IND message including handover rejection (HO_REJECT) information, to the serving BS. Therefore, the MSS notifies the serving BS of a handover rejection.

As described above, since the MSS aligns the neighbor BSs contained in the handover-executable final target BS candidate list from a BS having an optimal handover condition, when the MSS selects one of the remaining neighbor BSs except for the serving BS as a final target BS through the procedure regarding whether the occurrence of the pingpong effect is recognized, the selected target BS corresponds to a BS having favorable conditions as compared with other neighbor BSs for which the procedure regarding whether the occurrence of the pingpong effect is recognized has not been performed. Accordingly, the MSS transmits the MOB_HO_IND_type message including a HO_RELEASE option to the serving BS, so that the MSS can determine handover to the neighbor BS selected as the final target BS.

Figure 7:
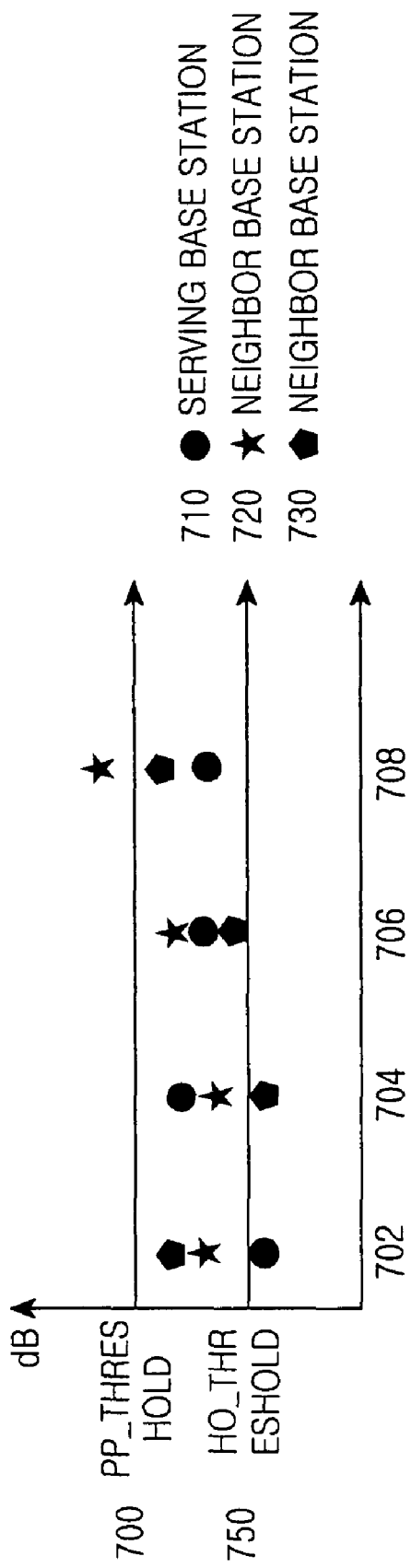
FIG. 7 is a diagram illustrating a relation between CINR values according to BSs, which allow an MSS to recognize a pingpong effect, in an IEEE 802.16e communication system according to an embodiment of the present invention.

FIG. 7 is a diagram illustrating a relation between CINR values according to BSs, which allow the MSS to recognize a pingpong effect, in the IEEE 802.16e communication system according to an embodiment of the present invention.

Referring to FIG. 7, the CINR values and threshold values required for allowing the MSS to recognize the pingpong effect are described. The PP_THRESHOLD 700 represents a threshold value in CINR values proper for receiving a normal communication service after the handover, and the HO_THRESHOLD 750 represents a threshold value in CINR values preset by the MSS in order to select a handover-executable target BS. Further, the reference number 710 represents the CINR value of a serving BS, the reference number 720 represents the CINR value of a first neighbor BS, and the reference number 730 represents the CINR value of a second neighbor BS. That is, when a CINR value having been measured for a random BS by the MSS is less than the PP_THRESHOLD and greater than the HO_THRESHOLD, the pingpong effect may occur.

The relation between the CINR values according to BSs shown in FIG. 7 will be described. In the reference number 702, since the CINR value 710 of the serving BS measured by the MSS is less than the HO_THRESHOLD 750, and the CINR value 720 of the first neighbor BS and the CINR value 730 of the second neighbor BS are greater than the CINR value 710 of the serving BS, the first neighbor BS and the second neighbor BS may be selected as handover-executable target BSs. However, since the CINR value 720 of the first neighbor BS and the CINR value 730 of the second neighbor BS are less than the PP_THRESHOLD, the first neighbor BS and the second neighbor BS are not selected as final target BSs. Herein, while the MSS ignores the PP_THRESHOLD and is handed over to the second neighbor BS, when the CINR value 730 of the second neighbor BS is measured again, it is highly possible that the newly measured the CINR value 730 may be less than the HO_THRESHOLD. This implies the occurrence of the pingpong effect which may require handover of the MSS to another BS again.

In the reference number 704, the MSS can understand that the CINR value 710 of the serving BS and the CINR value 720 of the first neighbor BS are greater than the HO_THRESHOLD, and the CINR value 730 of the second neighbor BS is less than the PP_THRESHOLD. Since there is no BS having a CINR value greater than the PP_THRESHOLD even in the reference number 704, a final target BS does not exist.

In the reference number 706, the MSS can understand that the CINR value 720 of the first neighbor BS is less than the CINR value 710 of the serving BS which is less than the CINR value 730 of the second neighbor BS, and the three CINR values are greater than the HO_THRESHOLD. Even in this case, since there is no BS having a CINR value greater than the PP_THRESHOLD, the final target BS does not exist, similarly to the reference number 704.

In the reference number 708, the MSS can understand that the CINR value 720 of the first neighbor BS is greater than the PP_THRESHOLD, the CINR value 710 of the serving BS and the CINR value 730 of the second neighbor BS are less than the PP_THRESHOLD and greater than the HO_THRESHOLD. Accordingly, the MSS can select the first neighbor BS as the final target BS to which the MSS is to be handed over.

Figure 8:
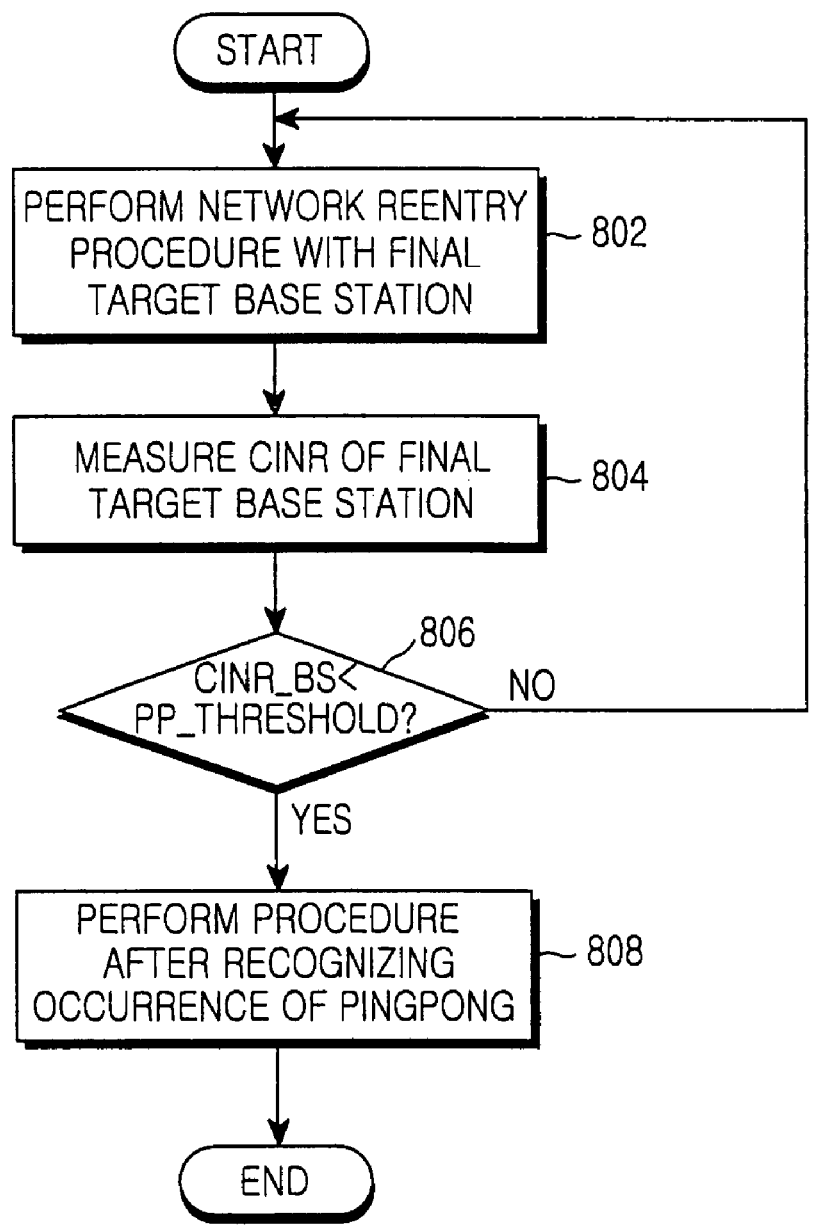
FIG. 8 is a flow diagram illustrating an operation process of an MSS when a pingpong effect occurs during the performance of a network reentry procedure according to handover in an IEEE 802.16e communication system according to an embodiment of the present invention.

FIG. 8 is a flow diagram illustrating an operation process of the MSS when the pingpong effect occurs during the performance of a network reentry procedure according to the handover in the IEEE 802.16e communication system according to an embodiment of the present invention.

Figure 1:
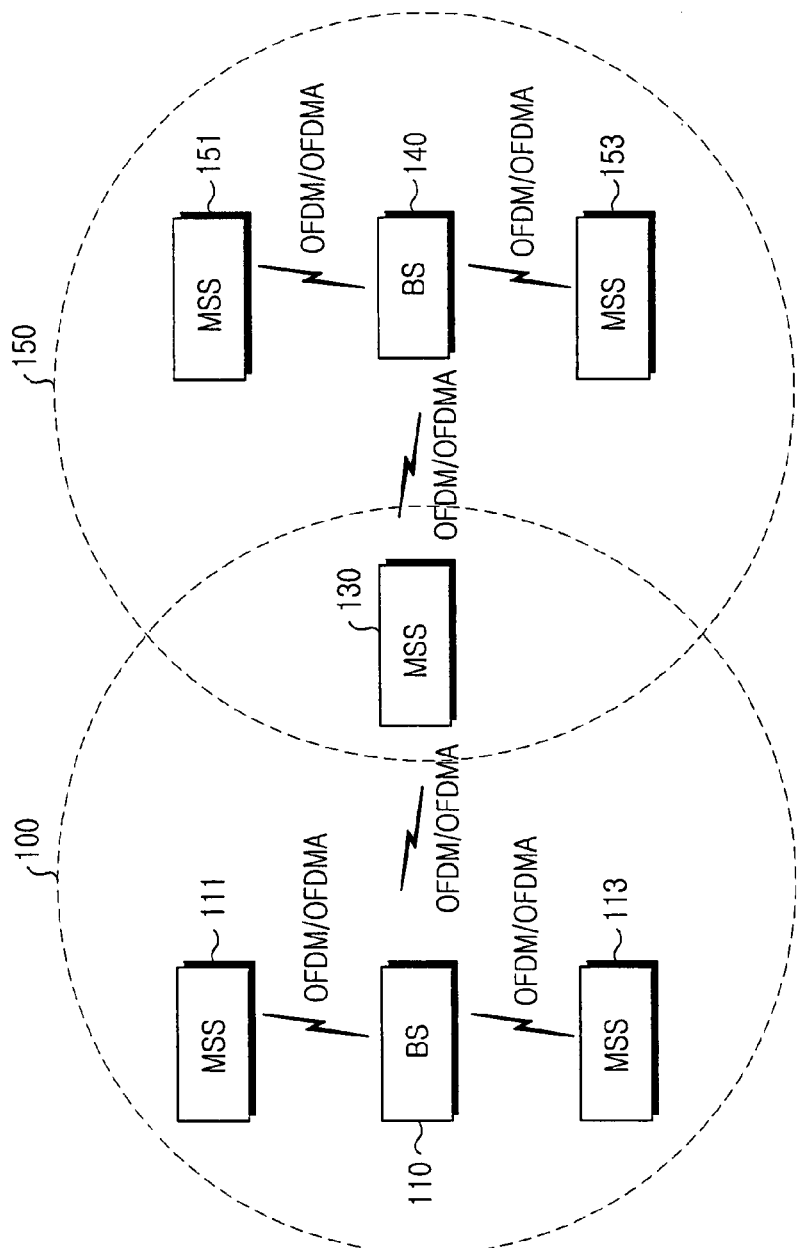
FIG. 1 is a block diagram showing the general structure of an IEEE 802.16e communication system.
Figure 2:
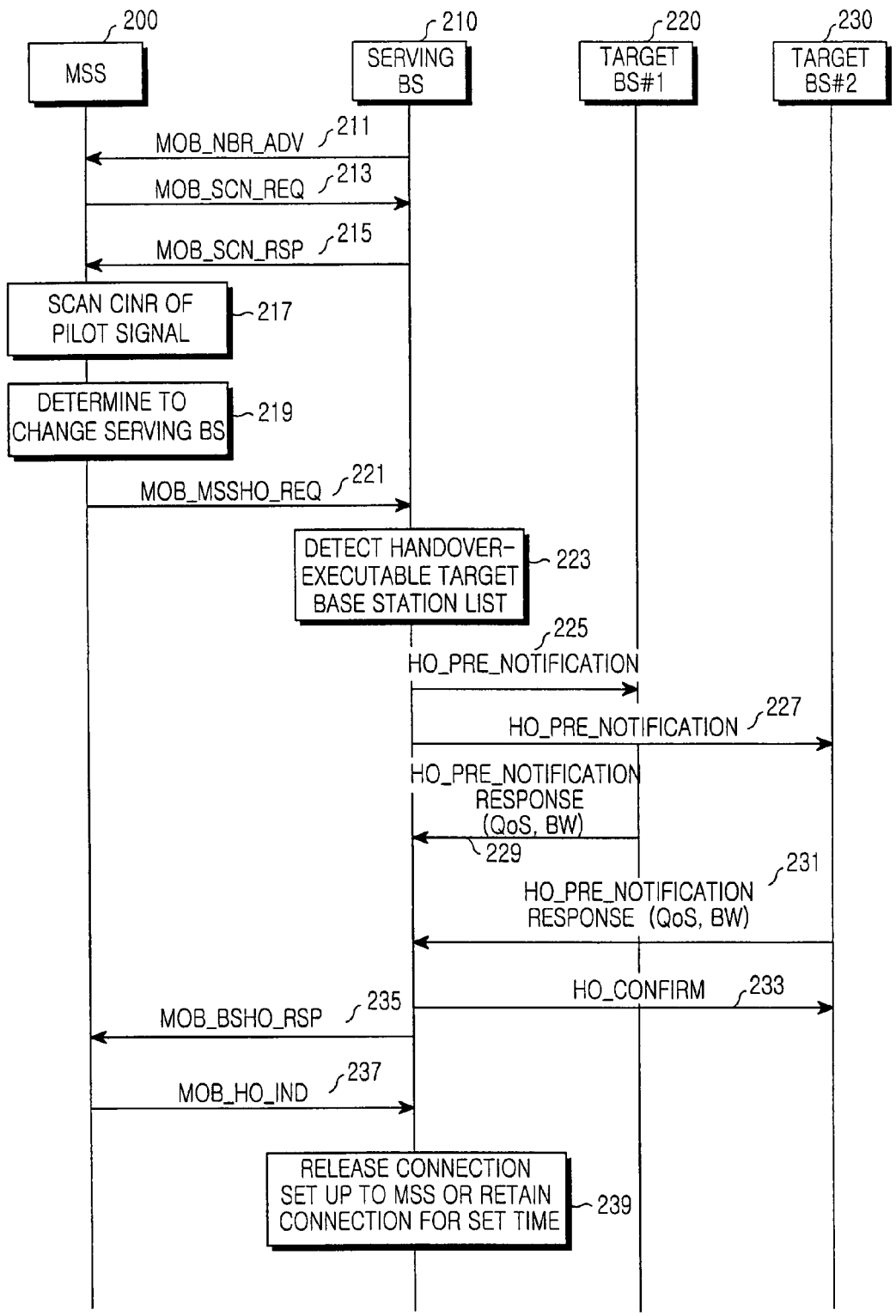
FIG. 2 is a flow diagram illustrating a general handover process by the request of an MSS in an IEEE 802.16e communication system.
Figure 3:
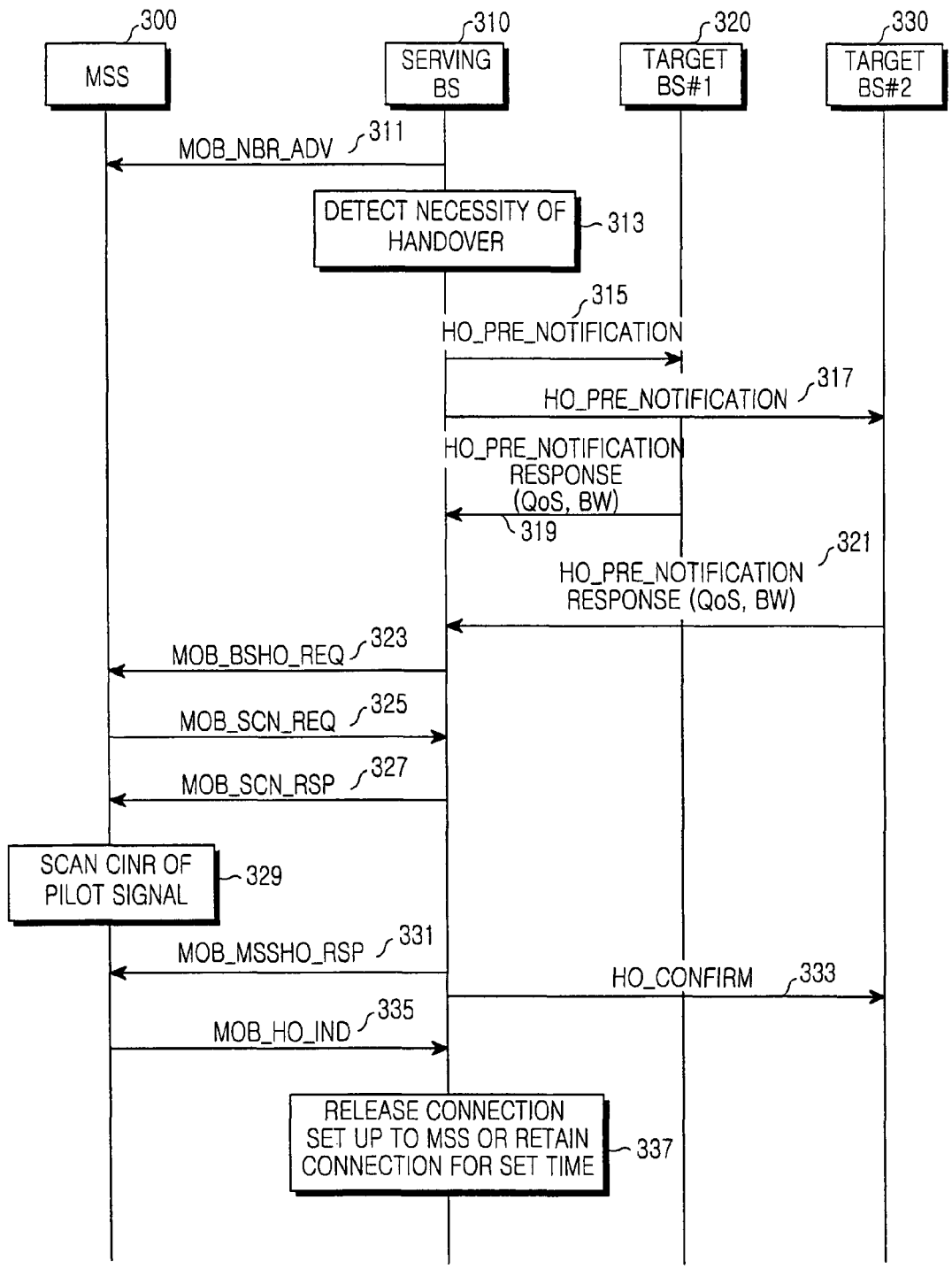
FIG. 3 is a flow diagram illustrating a general handover process by the request of a BS in an IEEE 802.16e communication system.
Figure 4:
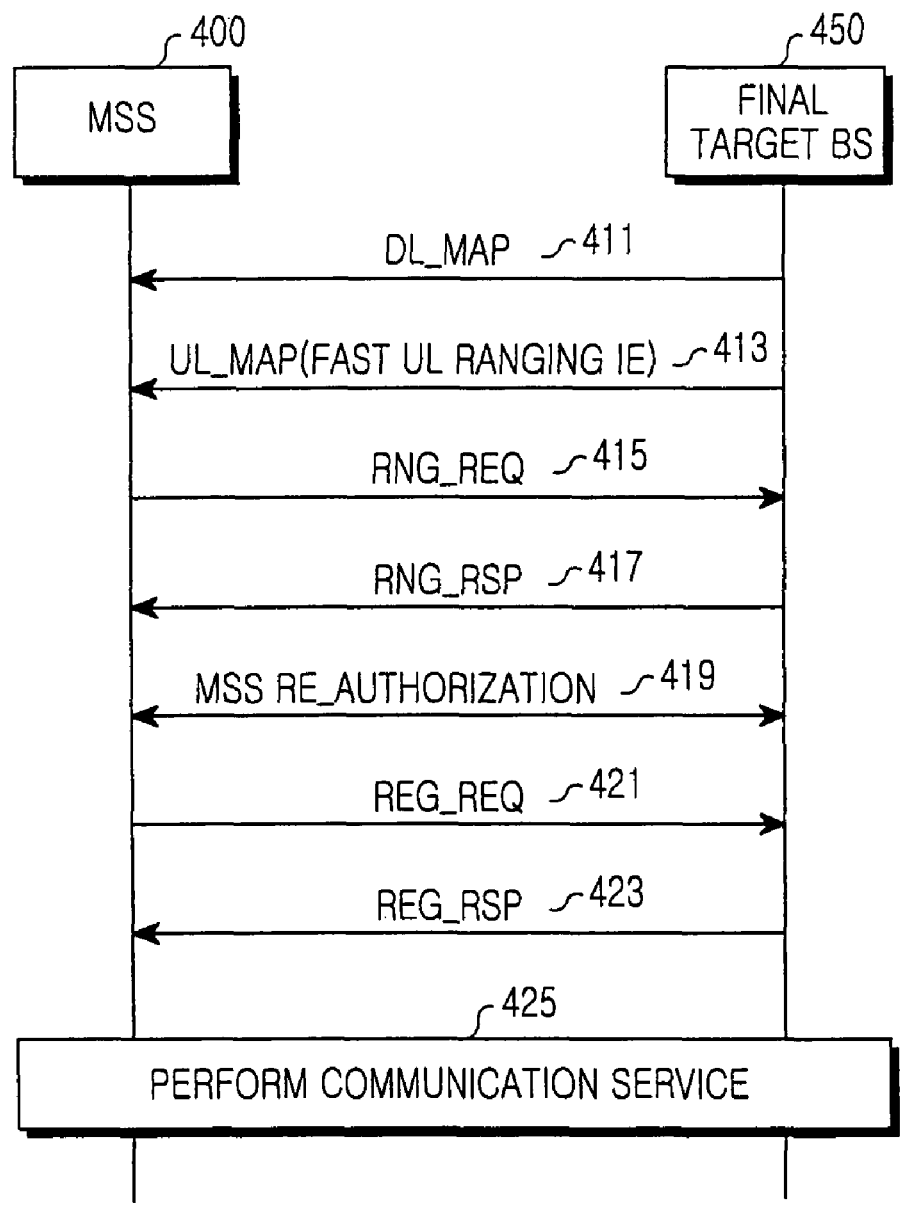
FIG. 4 is a flow diagram illustrating a general network reentry process according to handover of an MSS in an IEEE 802.16e communication system.

Referring to FIG. 8, in step 802, the MSS performs the network reentry procedure with the final target BS through a series of procedures relating to the handover of FIGS. 2 and 3. In the course of performing the network reentry procedure, step 804 is performed. In step 804, the MSS measures the CINR value of the final target BS, and step 806 is performed. In step 806, the MSS compares the measured CINR value (i.e., CINR_BS) of the final target BS with the PP_THRESHOLD. As a result of the comparison, when the CINR_BS is greater than the PP_THRESHOLD, step 802 is performed to allow the network reentry procedure with the final target BS to be continued. In contrast, when the CINR_BS is less than the PP_THRESHOLD in step 806, step 808 is performed. In step 808, the MSS recognizes that the pingpong effect may occur because the CINR_BS is less than the PP_THRESHOLD, and performs the process of FIG. 6 corresponding this case.

Figure 9:
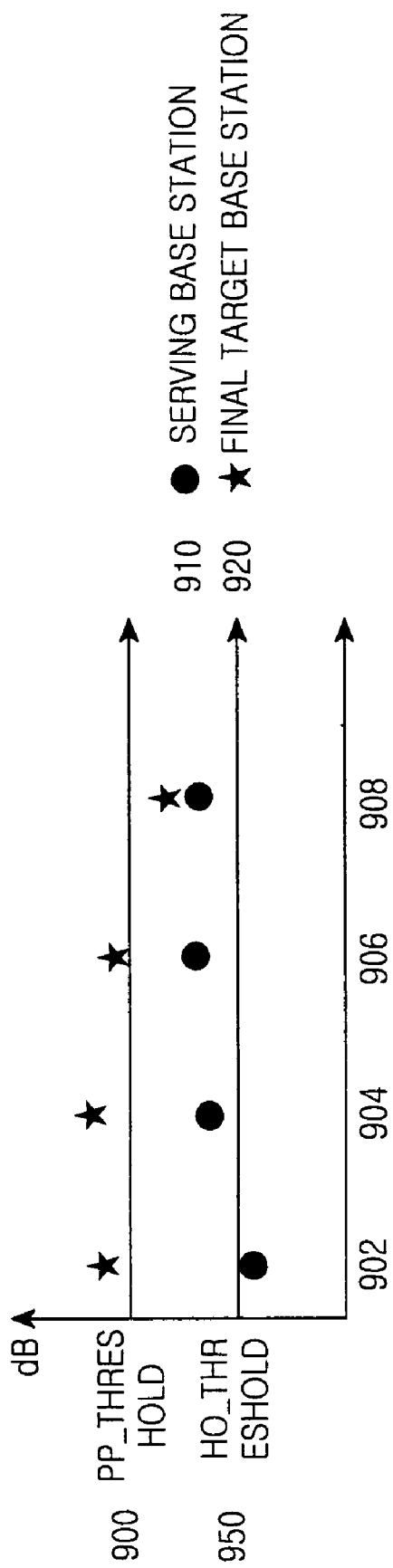
FIG. 9 is a diagram illustrating a relation between CINR values according to BSs, which are used for recognizing a pingpong effect occurring during the performance of a network reentry procedure according to handover in an IEEE 802.16e communication system according to an embodiment of the present invention.

FIG. 9 is a diagram illustrating a relation between CINR values according to BSs, which are used for recognizing the pingpong effect occurring during the performance of the network reentry procedure according to the handover in the IEEE 802.16e communication system according to an embodiment of the present invention.

Referring to FIG. 9, in the reference number 902, the CINR value 920 of the final target BS, which is measured by the MSS, is greater than the PP_THRESHOLD and the CINR value 910 of the serving BS is less than the HO_THRESHOLD. Accordingly, the MSS is handed over to the final target BS. In the reference numbers 904 and 906, the CINR value 920 of the final target BS, which is measured by the MSS, is greater than the PP_THRESHOLD and the CINR value 910 of the serving BS is also greater than the HO_THRESHOLD.

Accordingly, the MSS is handed over to the final target BS. In the reference number 908, as a result of the measurement of the CINR values of the final target BS and the serving BS by the MSS, the two values are less than the PP_THRESHOLD and greater than the HO_THRESHOLD. Accordingly, the MSS recognizes that it is impossible for the MSS to be handed over to the final target BS so as to perform a communication, and the pingpong effect requiring handover of the MSS to another BS may occur.

Figure 10:
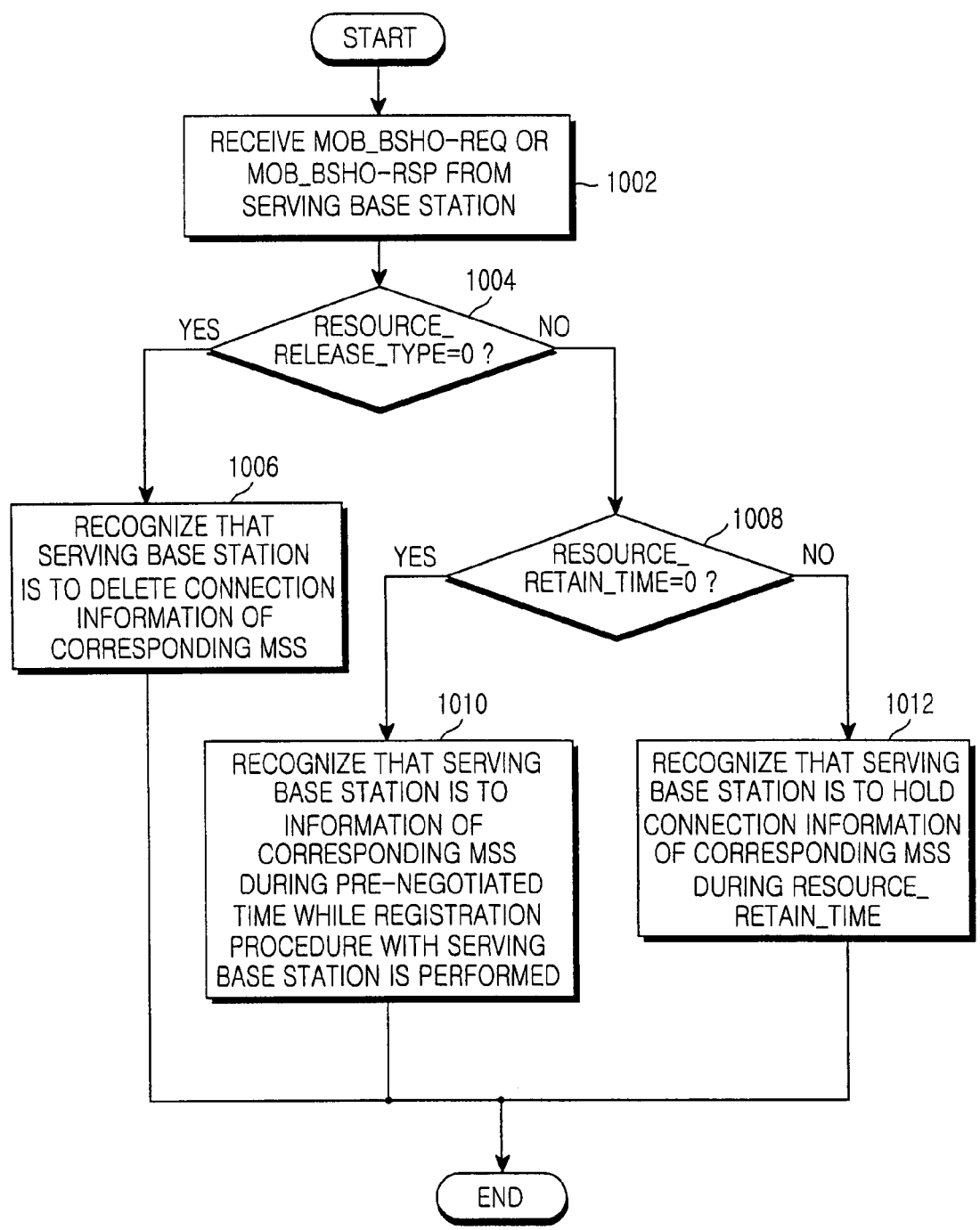
FIG. 10 is a flow diagram illustrating a process by which an MSS recognizes whether a serving BS retains connection information in an IEEE 802.16e communication system according to an embodiment of the present invention.

FIG. 10 is a flow diagram illustrating a process by which the MSS recognizes whether the serving BS retains connection information in the IEEE 802.16e communication system according to an embodiment of the present invention.

serving BS. Hereinafter, this scheme will be described with reference to Tables 16 and 17.

Tables 16 and 17 show the formats of modified handover messages proposed by the present invention. The modified handover messages are obtained by adding information (Resource_Remain_Type) regarding retaining or deletion of resource connection information for the MSS and information regarding a resource retaining time (Resource_Retain_Time) to the MOB_BSHO_RSP message and the MOB_BSHO_REQ message contained in the handover messages exchanged between the MSS and the serving BS when an existing handover procedure is performed.

TABLE 16

| Syntax | Size | Notes |
| --- | --- | --- |
| MOB_BSHO-RSP_message_Format( ) { | | |
| Management Message Type=?? | 8 bits | |
| Estimated HO time | 8 bits | |
| For (j=0;j< N_Recommended;J++){ | | Neighbor base stations shall be presented in an order such that the first presented is the one most recommended and the last presented is the least recommended. N_Recommended can be derived from the known length of the message. |
| Neighbor BS-ID | 48 bits | |
| Service level prediction | 8 bits | |
| } | | |
| Resource_Remain_Type | 1 bits | 0: MSS resource release 1: MSS resource retain |
| Resource_Retain_Time | 8 bits | Time duration for case where Resource_Remain_Type value is 1. Units are frames. |
| reserved | 7 bits | Reserved; shall be set to zero |
| } | | |

Referring to FIG. 10, in step 1002, the MSS receives a MOB_BSHO_REQ message or a MOB_BSHO_RSP message from the serving BS, and step 1004 is performed. Herein, as described in the prior art, after the serving BS has received a MOB_HO_IND message ("HO_IND_Type=00") transmitted from the MSS, the serving BS may delete the connection information with the MSS or retain the connection information for a predetermined time until the serving BS receives a notification representing the completion of a handover procedure from the final target BS. If it is a case in which the serving BS has deleted the connection information with the MSS, the serving BS does not have the information for the MSS when the MSS has changed a connection to the serving BS again due to the pingpong effect occurred while the MSS performs the network reentry procedure with the final target BS. Accordingly, the serving BS and the MSS perform an general initial communication procedure. Further, if the MSS may be able to determine if the serving BS has deleted the connection information with the MSS or retains the connection information for the predetermined time, the MSS performs the procedure corresponding to each case, so that overhead due to the pingpong effect can be reduced.

Further, the present invention provides a scheme by which the serving BS having received the MOB_HO-IND message ("HO_IND_type=00") from the MSS informs the MSS that the serving BS will delete the connection information of the MSS or retain the connection information for the predetermined time as described above, thereby minimizing the service delay which may occur in a reconnection setup with the As shown in Table 16, the MOB_BSHO_RSP message newly proposed by the present invention has a structure obtained by newly adding the Resource_Remain_Type field and the Resource_Retain_Time field to the existing MOB_BSHO_RSP message. The Resource_Remain_Type field provides information regarding whether the serving BS will delete or retain the connection information for the MSS. When the Resource_Remain_Type field shown in Table 16 has a value of 0, the serving BS deletes the connection information for the MSS. In contrast, when the Resource_Remain_Type field has a value of 1, the serving BS retains the connection information for the MSS during a time of the Resource_Retain_time field. The information for the predetermined time duration is stored in the Resource_Retain_Time field by the frame. For example, when the MSS has received the MOB_BSHO_RSP message in which the Resource_Remain_Type has been set to 1 and the Resource_Retain_Time has been set to 10, the serving BS retains the connection information for the MSS during 10 frames after receiving the MOB_HO_IND message ("HO_IND_type=00"). If the MSS has received the MOB_BSHO_RSP message in which the Resource_Remain_Type has been set to 1 and the Resource_Retain_Time has been set to 0, the MSS recognizes that the serving BS retains the connection information of the MSS for a time duration pre-negotiated during the performance of a registration procedure with the serving BS. Herein, the Resource_Retain_Time field has a frame unit, and the frame unit has the same meaning as that of the time unit. For example, 1 frame unit may be converted into a time unit of 20 ms.

When it is necessary to change a retaining time of the connection information of the MSS, which has been pre-negotiated during the performance of the registration procedure with the MSS, for example, when it is difficult to retain the connection information of the MSS, which is to be handed over to a target BS, during a preset time duration due to the insufficiency of the buffer capacity of the serving BS, or when it is possible to retain the connection information of the MSS, which is to be handed over to the target BS, longer than the preset time duration because the buffer conditions of the serving BS become better as compared with the previous registration procedure performance, the serving BS may set the Resource_Retain_Time of the MOB_BSHO_RSP message or the MOB_BSHO_REQ message to have a random value other than 0.

The following Table 17 shows the structure the MOB_BSHO_REQ message newly proposed by the present invention.

TABLE 17

| Syntax | Size | Notes |
| --- | --- | --- |
| MOB_BSHO_REQ_message_Format( ) { | | |
| Management Message Type=?? | 8 bits | |
| For (j=0;j< N_Recommended;J++){ | | N_Recommended can be derived from the known length of the message |
| Neighbor BS-ID | 48 bits | |
| Service level prediction } | 8 bits | |
| Resource_Remain_Type | 1 bits | 0: MSS resource release<br>1: MSS resource retain |
| Resource_Retain_Time | 8 bits | Time duration for case where Resource_Remain_Type value is 1 |
| reserved } | 7 bits | Reserved; shall be set to zero |

As shown in Table 17, the MOB_BSHO_REQ message has a structure obtained by adding the Resource_Remain_Type field and the Resource_Retain_Time field to the existing MOB_BSHO_REQ message, similarly to the MOB_BSHO_RSP message. The Resource_Remain_Type field reports whether to delete the connection information or retain the connection information during a predetermined time duration, and the Resource_Retain_Time field reports the predetermined time duration when the connection information is retained during the predetermined time duration. When the time pre-negotiated during the performance of the registration procedure with the MSS is applied to the Resource_Retain_Time field similarly to the MOB_BSHO_RSP message, the serving BS sets the Resource_Retain_Time field to have a value of 0. Further, when the serving BS optionally determines a connection information-retaining time, the serving BS sets the Resource_Retain_Time field to have a random value other than 0.

When the serving BS retains the connection information of the handovered MSS, the connection information may be usefully utilized not only in performing handover due to the pingpong effect, but also when the MSS communicates with a target BS requiring drop-recovery after finding the target BS requiring the drop-recovery in an occurrence of a drop situation during a handover with the serving BS. That is, if the MSS recognizes that the serving BS retains the connection information with the MSS, the fact that the connection information of the MSS can be received from the serving BS through a backbone network is reported to the drop recovery-targeted target BS, so that the drop recovery procedure can be performed within a short time.

Returning again to FIG. 10, in step 1004, the MSS performs the next steps according to values recorded in the Resource_Remain_Type field contained in the MOB_BSHO_REQ message or the MOB_BSHO_RSP message transmitted from the serving BS. If 0 has been recorded in the Resource_Remain_Type field, step 1006 is performed. In step 1006, the MSS recognizes that the serving BS will delete the connection information of a corresponding MSS. In step 1004, if 1 has been recorded in the Resource_Remain_Type field, step 1008 is performed. In step 1008, the MSS checks whether 0 has been recorded in the Resource_Retain_Time field contained in the MOB_BSHO_REQ message or the MOB_BSHO_RSP message. As a result of the check, when 0 has been recorded in the Resource_Retain_Time field, step 1010 is performed. In step 1010, the MSS recognizes that the serving BS will retain the connection information of the MSS for the time duration pre-negotiated during the performance of the registration procedure with the serving BS. Meanwhile, in step 1008, when a random value other than 0 has been recorded in the Resource_Retain_Time field, step 1012 is performed. In step 1012, the MSS recognizes that the serving BS will retain the connection information of the MSS for the time duration recorded in the Resource_Retain_Time field. Accordingly, while the serving BS retains the connection information of the MSS, when the MSS is handed over to the serving BS again during communication with another target BS, the MSS can reopen communication with the serving BS by performing only a ranging procedure of the network reentry procedure.

Figure 11:
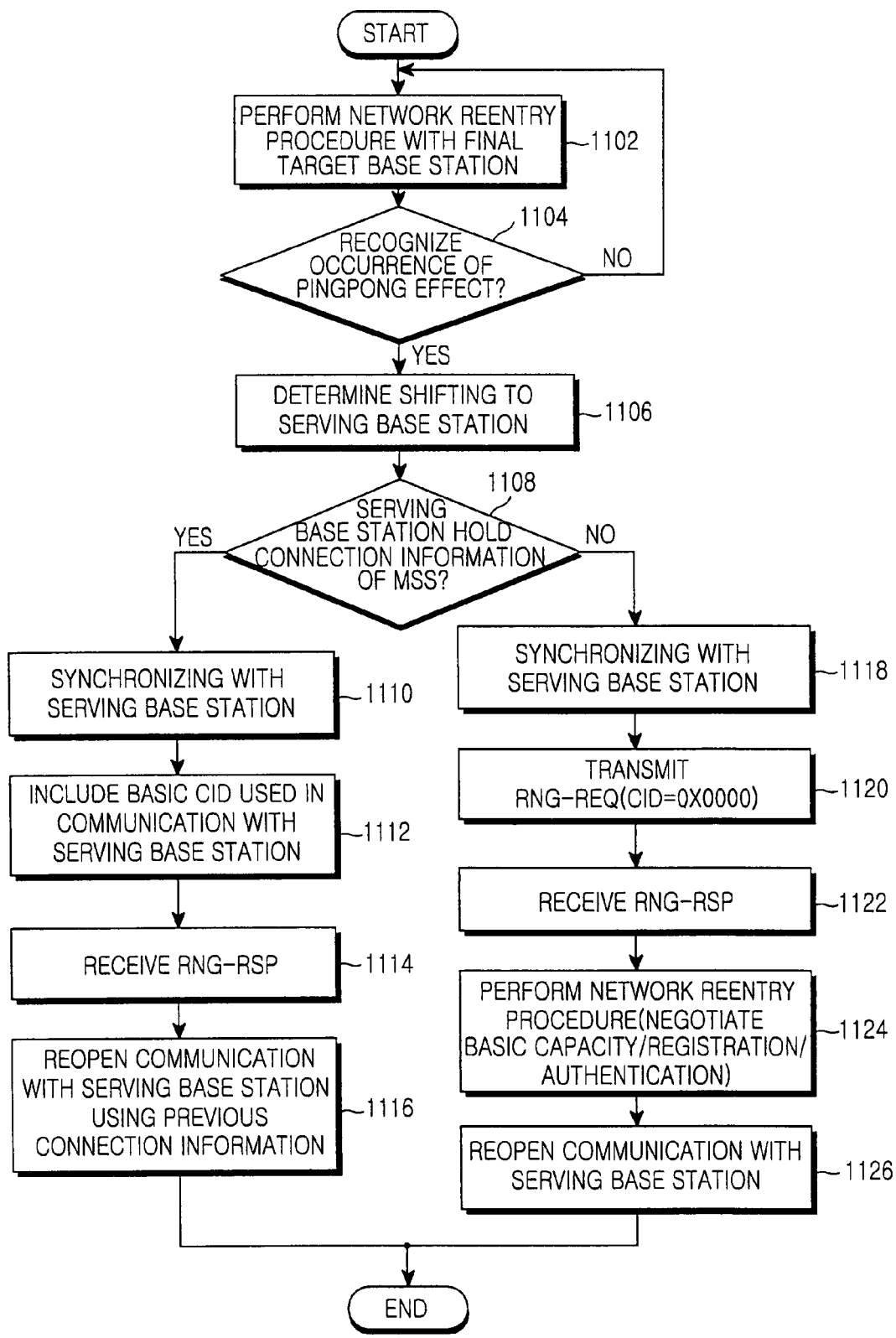
FIG. 11 is a flow diagram illustrating a handover operation process of an MSS that recognizes whether a serving BS retains connection information of the MSS in an IEEE 802.16e communication system according to an embodiment of the present invention.

FIG. 11 is a flow diagram illustrating a handover operation process of the MSS that recognizes whether the serving BS retains the connection information of the MSS in the IEEE 802.16e communication system according to an embodiment of the present invention.

Referring to FIG. 11, in step 1102, the MSS performs the network reentry procedure with the final target BS. In the course of performing the network reentry procedure, step 1104 is performed. In step 1104, when the CINR value of the final target BS is less than the PP_THRESHOLD, the MSS determines if the pingpong effect may occur. As a result of the determination, when the MSS recognizes that the pingpong effect does not occur, step 1102 is performed again. The MSS continuously performs the network reentry procedure. When the MSS recognizes that the pingpong effect will occur, step 1106 is performed. In step 1106, the MSS determines to handover to the serving BS. Then, step 1108 is performed. In step 1108, the MSS determines if the serving BS retains the connection information of the MSS. Herein, the MSS may determine whether the connection information is retained by means of the information (Resource_Remain_Type) obtained through the MOB_BSHO_RSP message or the MOB_BSHO_REQ message received from the serving BS. As a result of the determination, when the serving BS retains the connection information of the MSS, step 1110 is performed.

In step 1110, the MSS synchronizes with the serving BS. Then, step 1112 is performed. In step 1112, the MSS having synchronized with the serving BS inserts a Basic Connection ID (CID) used in communication with the serving BS into a RNG_REQ message for an initial ranging, and transmits the RNG_REQ message to the serving BS. Then, step 1114 is performed. In step 1114, the MSS receives a RNG_RSP message from the serving BS as a response for the RNG_REQ message. Then, step 1116 is performed. In step 1116, the MSS may omit a procedure relating to a basic capacity negotiation, an authentication and a registration, and reopen communication with the serving BS by means of the connection information retained by the serving BS.

Meanwhile, in step 1108, when the serving BS has deleted the connection information of the MSS, step 1118 is performed. In step 1118, the MSS synchronizes with the serving BS. Then, step 1120 is performed. In step 1120, the MSS transmits the RNG_REQ message to the serving BS and performs the initial ranging procedure. Then, step 1122 is performed. Herein, the RNG_REQ message transmitted from the MSS includes a CID having been set to 0x0000 as in the case of the general initial ranging procedure. In step 1122, the MSS receives the RNG_RSP message from the serving BS. Then, step 1124 is performed. In step 1124, the MSS performs the existing network reentry procedure, that is, the procedure relating to the basic capacity negotiation, the authentication and the registration, with the serving BS. Then, step 1126 is performed. In step 1126, the MSS having completed the network reentry procedure reopens communication with the serving BS.

The RNG_REQ message for the Basic CID contained in the RNG_REQ message has an encoding structure as shown in Table 18.

TABLE 18

| Name | Type | Length | Values (Variable-length) |
|---|---|---|---|
| Basic CID | TBD (6) | 2 | The Basic CID assigned from the former Serving BS |

As shown in Table 18, the encoding structure of the RNG_REQ message for the Basic CID includes a Type representing that the type of a TLV set in the RNG_REQ message is a Basic CID, a Length reporting the length (2 bytes) of the Basic CID, and a Value representing what the Basic CID means. The Basic CID is Basic CID information used when the MSS communicates with the serving BS. Herein, it is noted that the Type field has a value of 6 (random value) and may change afterwards.

According to the present invention as described above, in an IEEE 802.16e communication system, which is a BWA communication system using an OFDM/OFDMA scheme, an MSS can recognize in advance situations in which handover may frequently occur between a serving BS and a plurality of target BSs, that is, situations in which a pingpong effect may occur. That is, a PP_THRESHOLD is set, so that handover to a BS having a CINR value less than the PP_THRESHOLD can be prevented. Accordingly, the MSS can maximally prevent the situations in which the pingpong effect may occur. Further, the present invention allows BSs to flexibly retain or delete connection information of the MSS according to channel conditions, so that a network reentry procedure including only an initial ranging is performed when the MSS is handed over to a final target BS having retained the connection information. Therefore, a communication service can be quickly reopened.

While the present invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for performing a handover by a Mobile Subscriber Station (MSS) in a Broadband Wireless Access (BWA) communication system including a serving Base Station (BS) for providing a service to the MSS and a target BS adjacent to the serving BS, the method comprising the steps of:

receiving a handover request message from the serving BS, the handover request message including a resource remain type field representing whether connection information having been set between the serving BS and the MSS is retained;

determining whether the serving BS retains the connection information according to a value of the resource remain type field and determining a resource retain time during which the serving BS will retain the connection information when the resource remain type field represents retention of the connection information, wherein the resource retain time represents a system retaining time representing a pre-negotiated time agreed to when a registration is performed between the serving BS and the MSS;

transmitting a handover indication message to the serving BS, the handover indication message including information reporting performance of the handover and representing that retention of the connection information starts from a point in time at which the handover indication message is received by the serving BS;

releasing connection with the serving BS upon transmission of the handover indication message;

determining a reentry to the serving BS during a handover to the target BS; and reopening communication with the serving BS using the connection information, when the serving BS retains the connection information.

2. A method for performing a handover by a Mobile Subscriber Station (MSS) in a Broadband Wireless Access (BWA) communication system including a serving Base Station (BS) for providing a service to the MSS and a target BS adjacent to the serving BS, the method comprising the steps of:

transmitting a handover request message to the serving BS;

receiving a handover response message from the serving BS, the handover response message including a resource remain type field representing whether connection information having been set between the serving BS and the MSS is retained;

determining whether the serving BS retains the connection information according to a value of the resource remain type field and determining a resource retain time during which the serving BS will retain the connection information when the resource remain type field represents retention of the connection information, wherein the resource retain time represents a system retaining time representing a pre-negotiated time agreed to when a registration is performed between the serving BS and the MSS;

transmitting a handover indication message to the serving BS, the handover indication message including information reporting performance of the handover and representing that retention of the connection information starts from a point in time at which the handover indication message is received by the serving BS;

releasing connection with the serving BS upon transmission of the handover indication message;

determining a reentry to the serving BS during a handover to the target BS; and reopening communication with the serving BS using the connection information, when the serving BS retains the connection information.

3. A method for performing a handover by a serving Base Station (BS) for providing a service to a Mobile Subscriber Station (MSS) in a Broadband Wireless Access (BWA) communication system including a target BS adjacent to the serving BS, the method comprising the steps of:

transmitting a handover request message to the MSS, the handover request message including a resource remain type field representing whether connection information having been set between the serving BS and the MSS is retained;

receiving a handover indication message including information reporting performance of a handover by the MSS from the MSS;

releasing connection with the MSS upon reception of the handover indication message;

retaining the connection information according to a value of the resource remain type field during a resource retain time during which the serving BS will retain the connection information when the resource remain type field represents retention of the connection information, wherein the resource retain time represents a system retaining time representing a pre-negotiated time agreed to when a registration is performed between the serving BS and the MSS; and reopening communication with the MSS using the connection information, when the serving BS retains the connection information during a reentry of the MSS.

4. The method as claimed in claim 3, wherein retaining the connection information starts from a point in time at which the handover indication message is received from the MSS, when the value of the resource remain type field represents retention of the connection information.

5. The method as claimed in claim 3, wherein the handover indication message includes a handover indication type (HO_IND_type) that represents release of the serving BS when the HO_IND_type=00.

6. The method as claimed in claim 3, wherein the connection information is deleted when the value of the resource remain type field does not represent retention of the connection information.

7. A method for performing a handover by a serving Base Station (BS) for providing a service to a Mobile Subscriber Station (MSS) in a Broadband Wireless Access (BWA) communication system including a target BS adjacent to the serving BS, the method comprising the steps of:

receiving a handover request message from the MSS;

transmitting a handover response message to the MSS, the handover response message including a resource remain type field representing whether connection information having been set with the MSS is retained;

receiving a handover indication message including information reporting performance of a handover by the MSS from the MSS;

releasing connection with the MSS upon reception of the handover indication message;

retaining the connection information according to a value of the resource remain type field during a resource retain time during which the serving BS will retain the connection information when the resource remain type field represents retention of the connection information, wherein the resource retain time represents a system retaining time representing a pre-negotiated time agreed to when a registration is performed between the serving BS and the MSS; and reopening communication with the MSS using the connection information, when the serving BS retains the connection information during a reentry of the MSS.

8. The method as claimed in claim 7, wherein retaining the connection information starts from a point in time at which the handover indication message is received from the MSS, when the value of the resource remain type field represents retention of the connection information.

9. The method as claimed in claim 7, wherein the handover indication message includes a handover indication type (HO_IND_type) that represents release of the connection with the serving BS when the HO_IND_type=00.

10. A system for performing a handover in a Broadband Wireless Access (BWA) communication system including a Mobile Subscriber Station (MSS), a serving Base Station (BS) for providing a service to the MSS, and a target BS adjacent to the serving BS, the system comprising:

an MSS adapted to:

transmit a handover request message to the serving BS, receive a handover response message from the serving BS, the handover response message including a resource remain type field representing whether preset connection information is retained;

determine whether the serving BS retains the connection information according to a value of the resource remain type field and determine a resource retain time during which the serving BS will retain the connection information when the resource remain type field represents retention of the connection information, wherein the resource retain time represents a system retaining time representing a pre-negotiated time agreed to when a registration is performed between the serving BS and the MSS;

transmit a handover indication message to the serving BS, the handover indication message including information reporting performance of the handover and representing that retention of the connection information starts from a point in time at which the handover indication message is received by the serving BS;

release connection with the serving BS upon transmission of the handover indication message;

determine a reentry to the serving BS during a handover to the target BS; and reopen communication with the serving BS using the connection information, when the serving BS retains the connection information; and a serving BS adapted to:
- receive the handover request message from the MSS;
- transmit the handover response message to the MSS, the handover response message including the resource remain type field;
- receive the handover indication message including the information reporting performance of the handover by the MSS from the MSS;
- release the connection with the MSS upon reception of the handover indication message;
- retain the connection information according to the value of the resource remain type field during the system retaining time; and
- reopen communication with the MSS using the connection information, when the serving BS retains the connection information in a reentry of the MSS.

11. A system for performing a handover in a Broadband Wireless Access (BWA) communication system including a Mobile Subscriber Station (MSS), a serving Base Station (BS) for providing a service to the MSS, and a target BS adjacent to the serving BS, the system comprising:

an MSS adapted to:
- receive a handover request message from the serving BS, the handover request message including a resource remain type field representing whether connection information having been set with the serving BS is retained;
- recognize whether the serving BS retains the connection information according to a value of the resource remain type field and recognizing a resource retain time during which the serving BS will retain the connection information when the resource remain type field represents retention of the connection information, wherein the resource retain time represents a system retaining time representing a pre-negotiated time agreed to when a registration is performed between the serving BS and the MSS;
- transmit a handover indication message to the serving BS, the handover indication message including information reporting performance of the handover and representing that retention of the connection information starts from a point in time at which the handover indication message is received by the serving BS;
- release connection with the serving BS upon transmission of the handover indication message;
- determine a reentry to the serving BS during a handover to the target BS; and
- reopen communication with the serving BS using the connection information, when the serving BS retains the connection information; and a serving BS adapted to:
- transmit the handover request message to the MSS, the handover request message including the resource remain type field;
- receive the handover indication message including the information reporting performance of the handover by the MSS from the MSS;
- release the connection with the MSS upon reception of the handover indication message;
- retain the connection information according to the value of the resource remain type field during the system retaining time; and
- reopen communication with the MSS using the connection information, when the serving BS retains the connection information during a reentry of the MSS.

* * * * *